(12) United States Patent
Yamazaki et al.

(10) Patent No.: US 10,861,401 B2
(45) Date of Patent: Dec. 8, 2020

(54) LIQUID CRYSTAL DISPLAY DEVICE AND ELECTRONIC DEVICE CONFIGURED TO OPERATE AT TWO DIFFERENT REFRESH RATEES

(71) Applicant: SEMICONDUCTOR ENERGY LABORATORY CO., LTD., Atsugi (JP)

(72) Inventors: Shunpei Yamazaki, Tokyo (JP); Jun Koyama, Kanagawa (JP); Yoshiharu Hirakata, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 16/435,618

(22) Filed: Jun. 10, 2019

(65) Prior Publication Data

US 2019/0295480 A1 Sep. 26, 2019

Related U.S. Application Data

(63) Continuation of application No. 15/082,538, filed on Mar. 28, 2016, now Pat. No. 10,347,197, which is a
(Continued)

(30) Foreign Application Priority Data

Dec. 28, 2009 (JP) .................. 2009-298456

(51) Int. Cl.
*G09G 3/36* (2006.01)
*G02F 1/1335* (2006.01)
*G02F 1/1368* (2006.01)

(52) U.S. Cl.
CPC ............. *G09G 3/36* (2013.01); *G02F 1/1368* (2013.01); *G02F 1/133553* (2013.01);
(Continued)

(58) Field of Classification Search
CPC ................... G09G 3/36; G09G 3/3648; G09G 2300/0456; G09G 2310/063; G09G 2320/10; G02F 1/1368; G02F 1/133553
See application file for complete search history.

(56) References Cited

U.S. PATENT DOCUMENTS 5,475,398 A 12/1995 Yamazaki et al.
5,731,856 A 3/1998 Kim et al.
(Continued)

FOREIGN PATENT DOCUMENTS

CN 001782820 A 6/2006
CN 101604513 A 12/2009
(Continued)

OTHER PUBLICATIONS

International Search Report (Application No. PCT/JP2010/072316) dated Feb. 1, 2011.
(Continued)

*Primary Examiner* — Alexander Eisen
*Assistant Examiner* — Nathaniel P Brittingham
(74) *Attorney, Agent, or Firm* — Fish & Richardson P.C.

(57) ABSTRACT

To provide a liquid crystal display device which can perform image display in both modes: a reflective mode where external light is used as an illumination light source; and a transmissive mode where a backlight is used. In one pixel, a region where incident light through a liquid crystal layer is reflected to perform display (reflective region) and a region through which light from the backlight passes to perform display (transmissive region) are provided, and image display can be performed in both modes: the reflective mode where external light is used as an illumination light source; and the transmissive mode where the backlight is used as an illumination light source. In addition, two transistors connected to respective pixel electrode layers are
(Continued)

provided in one pixel, and the two transistors are separately operated, whereby display of the reflective region and display of the transmissive region can be controlled independently.

21 Claims, 16 Drawing Sheets

Related U.S. Application Data continuation of application No. 12/978,760, filed on Dec. 27, 2010, now Pat. No. 9,298,035.

(52) U.S. Cl.
CPC ... *G09G 3/3648* (2013.01); *G09G 2300/0456* (2013.01); *G09G 2310/063* (2013.01); *G09G 2320/10* (2013.01)

(56) References Cited

U.S. PATENT DOCUMENTS

| | | |
|---|---|---|
| 5,744,864 A | 4/1998 | Cillessen et al. |
| 5,844,535 A | 12/1998 | Itoh et al. |
| 6,195,140 B1 | 2/2001 | Kubo et al. |
| 6,294,274 B1 | 9/2001 | Kawazoe et al. |
| 6,295,109 B1 | 9/2001 | Kubo et al. |
| 6,330,047 B1 | 12/2001 | Kubo et al. |
| 6,452,654 B2 | 9/2002 | Kubo et al. |
| 6,535,985 B1 | 3/2003 | Oshima et al. |
| 6,552,711 B1 | 4/2003 | Nakamura |
| 6,563,174 B2 | 5/2003 | Kawasaki et al. |
| 6,597,348 B1 | 7/2003 | Yamazaki et al. |
| 6,683,666 B1 | 1/2004 | Jang et al. |
| 6,727,522 B1 | 4/2004 | Kawasaki et al. |
| 6,727,965 B1 | 4/2004 | Kubota |
| 6,765,637 B2 | 7/2004 | Takenaka |
| 6,819,379 B2 | 11/2004 | Kubo et al. |
| 6,821,655 B1 | 11/2004 | Ohta |
| 6,836,293 B2 | 12/2004 | Itoh et al. |
| 6,850,216 B2 | 2/2005 | Akimoto et al. |
| 6,927,818 B2 | 8/2005 | Hinata et al. |
| 6,950,159 B2 | 9/2005 | Kubo et al. |
| 6,980,268 B2 | 12/2005 | You |
| 7,023,508 B2 | 4/2006 | You |
| 7,049,190 B2 | 5/2006 | Takeda et al. |
| 7,053,969 B2 | 5/2006 | Yamazaki et al. |
| 7,061,014 B2 | 6/2006 | Hosono et al. |
| 7,064,346 B2 | 6/2006 | Kawasaki et al. |
| 7,068,335 B2 | 6/2006 | Jang et al. |
| 7,084,849 B2 | 8/2006 | Noguchi et al. |
| 7,105,868 B2 | 9/2006 | Nause et al. |
| 7,129,918 B2 | 10/2006 | Kimura |
| 7,145,536 B1 | 12/2006 | Yamazaki et al. |
| 7,151,581 B2 | 12/2006 | Kubo et al. |
| 7,211,825 B2 | 5/2007 | Shih et al. |
| 7,212,265 B2 | 5/2007 | Eguchis et al. |
| 7,256,836 B2 | 8/2007 | Itoh et al. |
| 7,274,420 B2 | 9/2007 | You |
| 7,282,782 B2 | 10/2007 | Hoffman et al. |
| 7,286,108 B2 | 10/2007 | Tsuda et al. |
| 7,297,977 B2 | 11/2007 | Hoffman et al. |
| 7,317,438 B2 | 1/2008 | Yamazaki et al. |
| 7,321,353 B2 | 1/2008 | Tsuda et al. |
| 7,323,356 B2 | 1/2008 | Hosono et al. |
| 7,362,295 B2 | 4/2008 | Park et al. |
| 7,385,224 B2 | 6/2008 | Ishii et al. |
| 7,385,579 B2 | 6/2008 | Satake |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,468,768 B2 | 12/2008 | Kubo et al. |
| 7,501,293 B2 | 3/2009 | Ito et al. |
| 7,505,026 B2 | 3/2009 | Baba et al. |
| 7,511,343 B2 | 3/2009 | Li et al. |
| 7,525,614 B2 | 4/2009 | Jeong et al. |
| 7,535,528 B2 | 5/2009 | Kubo et al. |
| 7,570,072 B2 | 8/2009 | Hata et al. |
| 7,612,849 B2 | 11/2009 | Eguchi et al. |
| 7,643,115 B2 | 1/2010 | Sato et al. |
| 7,652,735 B2 | 1/2010 | You |
| 7,663,717 B2 | 2/2010 | Kubo et al. |
| 7,674,650 B2 | 3/2010 | Akimoto et al. |
| 7,732,819 B2 | 6/2010 | Akimoto et al. |
| 7,738,055 B2 | 6/2010 | Egi et al. |
| 7,755,597 B2 | 7/2010 | Naka et al. |
| 7,777,840 B2 | 8/2010 | Enomoto et al. |
| 7,787,049 B2 | 8/2010 | Itoh et al. |
| 7,791,571 B2 | 9/2010 | Ohtani et al. |
| 7,796,192 B2 | 9/2010 | Itoh et al. |
| 7,821,613 B2 | 10/2010 | Kimura |
| 7,843,533 B2 | 11/2010 | Noguchi et al. |
| 7,893,495 B2 | 2/2011 | Li et al. |
| 7,903,209 B2 | 3/2011 | You |
| 7,924,276 B2 | 4/2011 | Tsuda et al. |
| 7,952,667 B2 | 5/2011 | Kubo et al. |
| 7,960,727 B2 | 6/2011 | Nakahara et al. |
| 7,961,162 B2 | 6/2011 | Kubo et al. |
| 8,054,423 B2 | 11/2011 | Kubo et al. |
| 8,139,173 B2 | 3/2012 | Kawamura et al. |
| 8,202,365 B2 | 6/2012 | Umeda et al. |
| 8,223,115 B2 | 7/2012 | Chung et al. |
| 8,228,469 B2 | 7/2012 | Kubo et al. |
| 8,345,172 B2 | 1/2013 | Kataoka |
| 8,354,674 B2 | 1/2013 | Kimura |
| 8,502,839 B2 | 8/2013 | Tseng et al. |
| 8,686,425 B2 | 4/2014 | Yamazaki et al. |
| 9,041,202 B2 | 5/2015 | Kimura |
| 9,397,255 B2 | 7/2016 | Kimura |
| 9,859,401 B2 | 1/2018 | Yamazaki et al. |
| 2001/0022584 A1 | 9/2001 | Tsugawa |
| 2001/0024187 A1 | 9/2001 | Sato et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2002/0169773 A1* | 11/2002 | Penrod ............... G06Q 30/02 |
| 2003/0030607 A1 | 2/2003 | Kitagawa et al. |
| 2003/0189401 A1 | 10/2003 | Kido et al. |
| 2003/0218222 A1 | 11/2003 | Wager, III et al. |
| 2004/0004685 A1 | 1/2004 | Luo |
| 2004/0036669 A1 | 2/2004 | Yanagi et al. |
| 2004/0038446 A1 | 2/2004 | Takeda et al. |
| 2004/0127038 A1 | 7/2004 | Carcia et al. |
| 2004/0135937 A1 | 7/2004 | Lee et al. |
| 2004/0169625 A1 | 9/2004 | Park et al. |
| 2004/0212575 A1 | 10/2004 | Lin et al. |
| 2004/0239846 A1 | 12/2004 | Wen et al. |
| 2005/0017302 A1 | 1/2005 | Hoffman |
| 2005/0094067 A1 | 5/2005 | Sakamoto et al. |
| 2005/0199959 A1 | 9/2005 | Chiang et al. |
| 2005/0270452 A1 | 12/2005 | Ahn et al. |
| 2006/0035452 A1 | 2/2006 | Carcia et al. |
| 2006/0043377 A1 | 3/2006 | Hoffman et al. |
| 2006/0044240 A1 | 3/2006 | Takizawa et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0125755 A1 | 6/2006 | Noguchi et al. |
| 2006/0139528 A1 | 6/2006 | Fujimori et al. |
| 2006/0146005 A1 | 7/2006 | Baba et al. |
| 2006/0158587 A1 | 7/2006 | Chang et al. |
| 2006/0169973 A1 | 8/2006 | Isa et al. |
| 2006/0170111 A1 | 8/2006 | Isa et al. |
| 2006/0187176 A1 | 8/2006 | Yang |
| 2006/0197092 A1 | 9/2006 | Hoffman et al. |

(56) References Cited

U.S. PATENT DOCUMENTS

| | | |
|---|---|---|
| 2006/0203154 A1 | 9/2006 | Uchida |
| 2006/0208977 A1 | 9/2006 | Kimura |
| 2006/0209002 A1 | 9/2006 | Uchikawa |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishilh |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0146592 A1 | 6/2007 | Kimura |
| 2007/0152217 A1 | 7/2007 | Lai et al. |
| 2007/0164961 A1 | 7/2007 | Koyama et al. |
| 2007/0172591 A1 | 7/2007 | Seo et al. |
| 2007/0176875 A1 | 8/2007 | Kageyama et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0242014 A1 | 10/2007 | Lee et al. |
| 2007/0247573 A1 | 10/2007 | Ouderkirk et al. |
| 2007/0252928 A1 | 11/2007 | Ito et al. |
| 2007/0272922 A1 | 11/2007 | Kim et al. |
| 2007/0279374 A1 | 12/2007 | Kimura et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0074592 A1 | 3/2008 | Araki et al. |
| 2008/0083950 A1 | 4/2008 | Pan et al. |
| 2008/0106191 A1 | 5/2008 | Kawase |
| 2008/0117151 A1 | 5/2008 | Nurmi et al. |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0198107 A1 | 8/2008 | Park et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0259099 A1 | 10/2008 | Arai et al. |
| 2008/0284720 A1 | 11/2008 | Fukutome |
| 2008/0284929 A1 | 11/2008 | Kimura |
| 2008/0284933 A1 | 11/2008 | Ito et al. |
| 2008/0296568 A1 | 12/2008 | Ryu et al. |
| 2008/0297465 A1 | 12/2008 | Kim et al. |
| 2008/0297676 A1 | 12/2008 | Kimura |
| 2008/0308805 A1 | 12/2008 | Akimoto et al. |
| 2008/0308806 A1 | 12/2008 | Akimoto et al. |
| 2009/0001380 A1* | 1/2009 | Yang .............. H01L 27/12 257/72 |
| 2009/0002586 A1 | 1/2009 | Kimura |
| 2009/0002597 A1 | 1/2009 | Watanabe |
| 2009/0008639 A1 | 1/2009 | Akimoto et al. |
| 2009/0009455 A1 | 1/2009 | Kimura |
| 2009/0011611 A1 | 1/2009 | Ichijo et al. |
| 2009/0045397 A1 | 2/2009 | Iwasaki |
| 2009/0051674 A1 | 2/2009 | Kimura et al. |
| 2009/0059107 A1 | 3/2009 | Nagai et al. |
| 2009/0068773 A1 | 3/2009 | Lai et al. |
| 2009/0072122 A1* | 3/2009 | Tada .............. H01L 27/14647 250/208.1 |
| 2009/0073325 A1 | 3/2009 | Kuwabara et al. |
| 2009/0109156 A1 | 4/2009 | Hu et al. |
| 2009/0114910 A1 | 5/2009 | Chang |
| 2009/0134399 A1 | 5/2009 | Sakakura et al. |
| 2009/0135128 A1 | 5/2009 | Jeon et al. |
| 2009/0152506 A1 | 6/2009 | Umeda et al. |
| 2009/0152541 A1 | 6/2009 | Maekawa et al. |
| 2009/0174835 A1 | 7/2009 | Lee et al. |
| 2009/0219295 A1 | 9/2009 | Reijnaerts |
| 2009/0239335 A1 | 9/2009 | Akimoto et al. |
| 2009/0250695 A1 | 10/2009 | Tanaka et al. |
| 2009/0278122 A1 | 11/2009 | Hosono et al. |
| 2009/0280600 A1 | 11/2009 | Hosono et al. |
| 2009/0290046 A1 | 11/2009 | Kita |
| 2009/0295786 A1* | 12/2009 | Ito .............. G09G 3/3648 345/215 |
| 2009/0298554 A1 | 12/2009 | Kim et al. |
| 2009/0303170 A1 | 12/2009 | Chung et al. |
| 2009/0305461 A1 | 12/2009 | Akimoto et al. |
| 2009/0315880 A1 | 12/2009 | Cho et al. |
| 2010/0014032 A1 | 1/2010 | Jepsen |
| 2010/0020276 A1 | 1/2010 | Jepsen |
| 2010/0065844 A1 | 3/2010 | Tokunaga |
| 2010/0084651 A1 | 4/2010 | Yamazaki et al. |
| 2010/0084655 A1 | 4/2010 | Iwasaki et al. |
| 2010/0092800 A1 | 4/2010 | Itagaki et al. |
| 2010/0109002 A1 | 5/2010 | Itagaki et al. |
| 2010/0136743 A1 | 6/2010 | Akimoto et al. |
| 2010/0155719 A1 | 6/2010 | Sakata et al. |
| 2010/0156928 A1 | 6/2010 | Lee et al. |
| 2010/0163863 A1 | 7/2010 | Yaegashi |
| 2010/0193785 A1 | 8/2010 | Kimura |
| 2010/0264403 A1 | 10/2010 | Sirringhaus et al. |
| 2010/0265280 A1 | 10/2010 | Yen et al. |
| 2010/0267198 A1 | 10/2010 | Yabuta et al. |
| 2011/0037914 A1 | 2/2011 | Noguchi et al. |
| 2011/0108909 A1 | 5/2011 | Weng et al. |
| 2011/0115839 A1 | 5/2011 | Takahashi et al. |
| 2011/0148832 A1 | 6/2011 | Nie et al. |
| 2011/0157216 A1 | 6/2011 | Yamazaki et al. |
| 2011/0157252 A1 | 6/2011 | Yamazaki et al. |
| 2011/0157253 A1 | 6/2011 | Yamazaki et al. |
| 2011/0157254 A1 | 6/2011 | Yamazaki et al. |
| 2011/0193852 A1 | 8/2011 | Lee et al. |
| 2011/0210332 A1 | 9/2011 | Jintyou et al. |
| 2011/0210988 A1 | 9/2011 | Kubo et al. |
| 2011/0222559 A1 | 9/2011 | Ishii et al. |
| 2011/0249037 A1 | 10/2011 | Koyama et al. |
| 2011/0249038 A1 | 10/2011 | Yamazaki et al. |
| 2011/0285290 A1 | 11/2011 | Griffin et al. |
| 2012/0001954 A1 | 1/2012 | Yamazaki et al. |
| 2012/0001955 A1 | 1/2012 | Yamazaki et al. |
| 2012/0002127 A1 | 1/2012 | Yamazaki et al. |
| 2012/0038604 A1 | 2/2012 | Liu et al. |
| 2013/0082607 A1 | 4/2013 | Gandhi et al. |
| 2013/0157393 A1 | 6/2013 | Kimura |
| 2016/0300862 A1 | 10/2016 | Kimura |
| 2017/0330902 A1 | 11/2017 | Kimura |

FOREIGN PATENT DOCUMENTS

| | | |
|---|---|---|
| EP | 1113308 A | 7/2001 |
| EP | 1296174 A | 3/2003 |
| EP | 1666961 A | 6/2006 |
| EP | 1737044 A | 12/2006 |
| EP | 1921681 A | 5/2008 |
| EP | 2187381 A | 5/2010 |
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 07-253566 A | 10/1995 |
| JP | 08-264794 A | 10/1996 |
| JP | 09-230827 A | 9/1997 |
| JP | 11-101992 A | 4/1999 |
| JP | 11-142810 A | 5/1999 |
| JP | 11-505377 | 5/1999 |

(56) References Cited

FOREIGN PATENT DOCUMENTS

| | | |
|---|---|---|
| JP | 2000-044236 A | 2/2000 |
| JP | 2000-150900 A | 5/2000 |
| JP | 2000-267635 A | 9/2000 |
| JP | 2001-075091 A | 3/2001 |
| JP | 2001-108961 A | 4/2001 |
| JP | 2001-201768 A | 7/2001 |
| JP | 2001-312253 | 11/2001 |
| JP | 2001-312253 A | 11/2001 |
| JP | 2002-006818 A | 1/2002 |
| JP | 2002-076356 A | 3/2002 |
| JP | 2002-207453 | 7/2002 |
| JP | 2002-207453 A | 7/2002 |
| JP | 2002-229021 A | 8/2002 |
| JP | 2002-244626 A | 8/2002 |
| JP | 2002-289859 A | 10/2002 |
| JP | 2003-086000 A | 3/2003 |
| JP | 2003-086808 A | 3/2003 |
| JP | 2003-140191 A | 5/2003 |
| JP | 2003-186031 A | 7/2003 |
| JP | 2003-222890 A | 8/2003 |
| JP | 2003-298879 A | 10/2003 |
| JP | 2004-103957 A | 4/2004 |
| JP | 2004-272270 A | 9/2004 |
| JP | 2004-273614 A | 9/2004 |
| JP | 2004-273732 A | 9/2004 |
| JP | 2004-286963 A | 10/2004 |
| JP | 2005-017493 A | 1/2005 |
| JP | 2005-024680 A | 1/2005 |
| JP | 2005-190295 A | 7/2005 |
| JP | 2005-275147 A | 10/2005 |
| JP | 2006-078789 A | 3/2006 |
| JP | 2006-119416 A | 5/2006 |
| JP | 2006-162680 A | 6/2006 |
| JP | 2006-234849 | 9/2006 |
| JP | 2006-234849 A | 9/2006 |
| JP | 2007-096055 A | 4/2007 |
| JP | 2007-123861 A | 5/2007 |
| JP | 2007-171367 A | 7/2007 |
| JP | 2007-293153 A | 11/2007 |
| JP | 2008-009042 A | 1/2008 |
| JP | 2008-083387 A | 4/2008 |
| JP | 2008-090312 A | 4/2008 |
| JP | 2008-098637 A | 4/2008 |
| JP | 2008-102397 | 5/2008 |
| JP | 2008-102397 A | 5/2008 |
| JP | 2008-261944 A | 10/2008 |
| JP | 2009-033145 A | 2/2009 |
| JP | 2009-042255 A | 2/2009 |
| JP | 2009-047965 A | 3/2009 |
| JP | 2009-058610 A | 3/2009 |
| JP | 2009-092745 A | 4/2009 |
| JP | 2009-116173 A | 5/2009 |
| JP | 2009-167087 | 7/2009 |
| JP | 2009-167087 A | 7/2009 |
| JP | 2009-175564 A | 8/2009 |
| JP | 2009-175704 A | 8/2009 |
| JP | 2009-180907 A | 8/2009 |
| JP | 2009-229967 A | 10/2009 |
| JP | 2009-302520 A | 12/2009 |
| JP | 2011-154358 A | 8/2011 |
| KR | 10-2007-0022765 | 2/2007 |
| KR | 2007-0022765 A | 2/2007 |
| WO | WO-2004/114391 | 12/2004 |
| WO | WO-2011/081011 | 7/2011 |

OTHER PUBLICATIONS

Written Opinion (Application No. PCT/JP2010/072316) dated Feb. 1, 2011.
Chinese Office Action (Application No. 201080060448.2) dated Jul. 3, 2014.
Taiwanese Office Action (Application No. 099145818) dated Sep. 17, 2015.
Korean Office Action (Application No. 2017-7016258) dated Sep. 13, 2017.
Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.
Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.
Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.
Cho.D et al., "21.2:Al and Sn-Doped Zinc Indium Oxide Thin Film Transistors for Amoled Back-Plane", SID Digest '09 : SID International Symposium Digest of Technical Papers, May 31, 2009, pp. 280-283.
Clark.S et al., "First Principles Methods Using CASTEP", Zeitschrift fur Kristallographie, 2005, vol. 220, pp. 567-570.
Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.
Costello.M et al., "Electron Microscopy of a Cholesteric Liquid Crystal and its Blue Phase", Phys. Rev. A (Physical Review. A), May 1, 1984, vol. 29, No. 5, pp. 2957-2959.
Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.
Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.
Fung.T et al., "2-D Numerical Simulation of High Performance Amorphous In—Ga—Zn-O TFTs for Flat Panel Displays", AM-FPD '08 Digest of Technical Papers, Jul. 2, 2008, pp. 251-252, The Japan Society of Applied Physics.
Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.
Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.
Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.
Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.
Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.
Ikeda.T et al., "Full-Functional System Liquid Crystal Display Using Cg-Silicon Technology", SID Digest '04 : SID International Symposium Digest of Technical Papers, 2004, vol. 35, pp. 860-863.
Janotti.A et al., "Native Point Defects in ZnO", Phys. Rev. B (Physical Review. B), Oct. 4, 2007, vol. 76, No. 16, pp. 165202-1-165202-22.
Janotti.A et al., "Oxygen Vacancies in ZnO", Appl. Phys. Lett. (Applied Physics Letters) , 2005, vol. 87, pp. 122102-1-122102-3.
Jeong.J et al., "3.1: Distinguished Paper: 12.1-Inch WXGA Amoled Display Driven by Indium-Gallium-Zinc Oxide TFTs Array", SID

(56) References Cited

OTHER PUBLICATIONS

Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission Amoled Display on Plastic Film and its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YBFE2O4, and YB2FE3O7 Types of Structures for Compounds in the In2O3 and SC2O3—A2O3—BO Systems [A; Fe, Ga, OR Al; B: Mg, Mn, Fe, Ni, Cu,or Zn] at Temperatures Over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m—7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID SYSTEMS", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED ", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "Suftla Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 58, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZNO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 in. QVGA Amoled Display Using In—Ga—Zn-Oxide TFTS With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA Amoled Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001 , vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, vol. 40, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTS and Their Application for Large Size Amoled", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

(56) References Cited

OTHER PUBLICATIONS

Park.S et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.
Prins.M et al., "A Ferroelectric Transparent Thin-Film Transistor", Appl. Phys. Lett. (Applied Physics Letters), Jun. 17, 1996, vol. 68, No. 25, pp. 3650-3652.
Sakata.J et al., "Development of 4.0-in. Amoled Display With Driver Circuit Using Amorphous In—Ga—Zn-Oxide TFTS", IDW '09 : Proceedings of the 16th International Display Workshops, 2009, pp. 689-692.
Son.K et al., "42.4L: Late-News Paper: 4 Inch QVGA Amoled Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.
Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.
Tsuda.K et al., "Ultra Low Power Consumption Technologies for Mobile TFT-LCDs ", IDW '02 : Proceedings of the 9th International Display Workshops, Dec. 4, 2002, pp. 295-298.
Ueno.K et al., "Field-Effect Transistor on SrTiO3 With Sputtered Al2O3 Gate Insulator" Appl. Phys. Lett. (Applied Physics Letters), Sep. 1, 2003, vol. 83, No. 9, pp. 1755-1757.
Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

\* cited by examiner

LIQUID CRYSTAL DISPLAY DEVICE AND ELECTRONIC DEVICE CONFIGURED TO OPERATE AT TWO DIFFERENT REFRESH RATEES

CROSS-REFERENCE TO RELATED APPLICATIONS

This application is a continuation of U.S. application Ser. No. 15/082,538, filed Mar. 28, 2016, now allowed, which is a continuation of U.S. application Ser. No. 12/978,760, filed Dec. 27, 2010, now U.S. Pat. No. 9,298,035, which claims the benefit of a foreign priority application filed in Japan as Serial No. 2009-298456 on Dec. 28, 2009, all of which are incorporated by reference.

TECHNICAL FIELD

The present invention relates to a semiconductor device having a circuit formed using a transistor and a manufacturing method thereof. The present invention relates to, for example, an electronic device on which an electro-optical device typified by a liquid crystal display panel is mounted as a component.

BACKGROUND ART

In a liquid crystal display device, an active matrix liquid crystal display device, in which pixel electrodes are provided in matrix and transistors are used as switching elements connected to respective pixel electrodes in order to obtain an image with high quality, has attracted attention.

An active matrix liquid crystal display device, in which transistors formed using a metal oxide for a channel formation region are used as switching elements connected to respective pixel electrode, has already been known (see Patent Document 1 and Patent Document 2).

It is known that an active matrix liquid crystal display device is classified into two major types: transmissive type and reflective type.

In the transmissive liquid crystal display device, a backlight such as a cold cathode fluorescent lamp or the like is used and optical modulation action of liquid crystals is utilized to choose one between the two states: a state in which light from the backlight passes through liquid crystal to be output to the outside of the liquid crystal display device and a state in which light is not output, whereby bright and dark images are displayed; further, image display is performed in combination of these.

Since the backlight is utilized in the transmissive liquid crystal display device, it is difficult to recognize display in the environment with strong external light, for example, outdoors.

In the reflective liquid crystal display device, the optical modulation action of liquid crystals is utilized to choose one between the two states: a state in which external light, that is, incident light is reflected by a pixel electrode to be output to the outside of the device and a state in which incident light is not output to the outside of the device, whereby bright and dark images are displayed; further, image display is performed in combination of these.

Compared to the transmissive liquid crystal display device, the reflective liquid crystal display device has the advantage of low power consumption since the backlight is not used; therefore, a demand for the reflective liquid crystal display device as a portable information terminal has increased.

Since external light is utilized in the reflective liquid crystal display device, the reflective liquid crystal display device is suited for image display in the environment with strong external light, for example, outdoors. On the other hand, it is difficult to recognize display when the liquid crystal display device is used in a dim environment, that is, in the environment with weak external light.

REFERENCE

[Patent Document 1] Japanese Published Patent Application No. 2007-123861
[Patent Document 2] Japanese Published Patent Application No. 2007-96055

DISCLOSURE OF INVENTION

It is an object to provide a liquid crystal display device which can recognize image display even when the liquid crystal display device is used in a dim environment.

It is another object to provide a liquid crystal display device which can perform image display in both modes: a reflective mode where external light is used as an illumination light source; and a transmissive mode where a backlight is used.

In one pixel, a region where incident light through a liquid crystal layer is reflected to perform display (reflective region) and a region through which light from the backlight passes to perform display (transmissive region) are provided, and image display can be performed in both modes: the reflective mode where external light is used as an illumination light source; and the transmissive mode where the backlight is used as an illumination light source. In addition, two transistors connected to respective pixel electrode layers are provided in one pixel, and the two transistors are separately operated, whereby the display regions of the connected pixel electrode layers can be controlled independently.

When there is external light with enough brightness, this liquid crystal display device is put in the reflective mode and a still image is displayed, whereby power consumption can be reduced.

When external light is weak or there is no external light, the backlight is turned on in the transmissive mode, and image display can be performed.

A sensor for detecting brightness of the surroundings of the liquid crystal display device is preferably provided. The reflective mode, the transmissive mode, or on/off of the backlight is preferably performed in accordance with data obtained using the sensor, and the amount of light is preferably adjusted in accordance with data obtained using the sensor.

For a light source of the backlight, it is preferable to use a plurality of light-emitting diodes (LEDs) in which power consumption can be further reduced as compared to the cold cathode fluorescent lamp and which can control the strength and weakness of light. The use of LEDs for the backlight partly controls the strength and weakness of light, whereby image display with high contrast and high color visibility can be performed.

According to one embodiment of the present invention disclosed in this specification, a liquid crystal display device includes: a display panel; a backlight portion; and an image processing circuit. The display panel includes a plurality of pixels each including a pair of a first sub-pixel and a second sub-pixel, and a first driver circuit configured to control a pixel portion including the plurality of pixels temporally.

The first sub-pixel includes a first pixel electrode which has a light-transmitting property and which is connected to a first scan line and a first signal line and which is configured to control an alignment state of liquid crystal, and a transistor connected to the first pixel electrode. The second sub-pixel includes a second pixel electrode which reflects visible light and which is connected to a second scan line and a second signal line and which is configured to control an alignment state of liquid crystal, and a transistor connected to the second pixel electrode. The backlight portion includes a plurality of light-emitting elements and a second driver circuit configured to control the plurality of light-emitting elements temporally. The image processing circuit includes a memory circuit configured to store image signals, a comparison circuit configured to compare the image signals stored in the memory circuit and to calculate a difference. The liquid crystal display device includes: a moving-image mode in which the comparison circuit determines that successive frame periods in which the difference is detected is a moving image period, the image processing circuit outputs a first signal including a moving image to the first signal line of the display panel, and the image processing circuit outputs a second signal in synchronization with the first signal to the backlight portion; and a still-image mode in which the comparison circuit determines that successive frame periods in which the difference is not detected is a still image period, the image processing circuit converts a still image in the still image period into a monochrome still image, the image processing circuit outputs the first signal including the monochrome still image to the second signal line of the display panel, and the image processing circuit stops output of a signal to the backlight portion.

According to another embodiment of the present invention disclosed in this specification, a liquid crystal display device includes: a display panel; a backlight portion; an image processing circuit; and a photometric circuit. The display panel includes a plurality of pixels each including a pair of a first sub-pixel and a second sub-pixel, and a first driver circuit configured to control a pixel portion including the plurality of pixels temporally. The first sub-pixel includes a first pixel electrode which has a light-transmitting property and which is connected to a first scan line and a first signal line and which is configured to control an alignment state of liquid crystal, and a transistor connected to the first pixel electrode. The second sub-pixel includes a second pixel electrode which reflects visible light and which is connected to a second scan line and a second signal line and which is configured to control an alignment state of liquid crystal, and a transistor connected to the second pixel electrode. The backlight portion includes a plurality of light-emitting elements and a second driver circuit configured to control the plurality of light-emitting elements temporally. The image processing circuit includes a memory circuit configured to store image signals, a comparison circuit configured to compare the image signals stored in the memory circuit and to calculate a difference. The liquid crystal display device includes: a moving-image mode in which the comparison circuit determines that successive frame periods in which the difference is detected is a moving image period, the image processing circuit outputs a first signal including a moving image to the first signal line of the display panel, and the image processing circuit outputs a second signal in synchronization with the first signal to the backlight portion; and a still-image display mode in which the comparison circuit determines that successive frame periods in which the difference is not detected is a still image period, the image processing circuit converts a still image in the still image period into a monochrome still image, the image processing circuit outputs the first signal including the monochrome still image to the second signal line of the display panel, and the image processing circuit stops output of a signal to the backlight portion. The photometric circuit detects external light, so that the backlight is adjusted in accordance with the detected external light when the still-image mode and the moving-image mode are switched.

According to another embodiment of the present invention disclosed in this specification, a liquid crystal display device includes: a display panel; a backlight portion; and an image processing circuit. The display panel includes a plurality of pixels each including a pair of a first sub-pixel and a second sub-pixel, and a first driver circuit configured to control a pixel portion including the plurality of pixels temporally. The first sub-pixel includes a first pixel electrode which has a light-transmitting property and which is connected to a first scan line and a first signal line and which is configured to control an alignment state of liquid crystal, and a transistor which includes an oxide semiconductor layer and which is connected to the first pixel electrode. The second sub-pixel includes a second pixel electrode which reflects visible light and which is connected to a second scan line and a second signal line and which is configured to control an alignment state of liquid crystal, and a transistor which includes an oxide semiconductor layer and which is connected to the second pixel electrode. The backlight portion includes a plurality of light-emitting elements and a second driver circuit configured to control the plurality of light-emitting elements temporally. The image processing circuit includes a memory circuit configured to store image signals, a comparison circuit configured to compare the image signals stored in the memory circuit and to calculate a difference. The liquid crystal display device includes: a moving-image mode in which the comparison circuit determines that successive frame periods in which the difference is detected is a moving image period, the image processing circuit outputs a first signal including a moving image to the first signal line of the display panel, and the image processing circuit outputs a second signal in synchronization with the first signal to the backlight portion; and a still-image mode in which the comparison circuit determines that successive frame periods in which the difference is not detected is a still image period, the image processing circuit converts a still image in the still image period into a monochrome still image, the image processing circuit outputs the first signal including the monochrome still image to the second signal line of the display panel, and the image processing circuit stops output of a signal to the backlight portion.

With the above structure, at least one of the above problems can be resolved.

According to one object of the present invention, a plurality of structures is provided in one pixel and a reflective electrode is provided on side surfaces of the plurality of structures and a pixel electrode having a transparent electrode is provided for upper portions of the plurality of structures.

An electronic device can be provided in which the liquid crystal display device disclosed in this specification and a solar battery. The solar battery and the display panel are opened and closed freely, and electric power from the solar battery is supplied to the display panel, the backlight portion, or the image processing circuit.

In this specification, a semiconductor device means all types of devices which can function by utilizing semiconductor characteristics, and an electro-optical device, a semiconductor circuit, and an electronic device are all semiconductor devices.

A liquid crystal display device in which image display can be performed in accordance with an environment of various brightness levels of external light can be provided. Further, low power consumption can be realized in displaying of a still image.

BEST MODE FOR CARRYING OUT THE INVENTION

Hereinafter, embodiments of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments.

Embodiment 1

In this embodiment, a liquid crystal display device including a still-image mode and a moving-image mode will be described with reference to FIG. 1. Note that in this specification, a mode performed in such a way that a display device determines image signals input to the display device as a still image is described as a still-image mode, and a mode performed in such a way that the display device determines the image signals input to the display device as a moving image is described as a moving-image mode.

Figure 1:
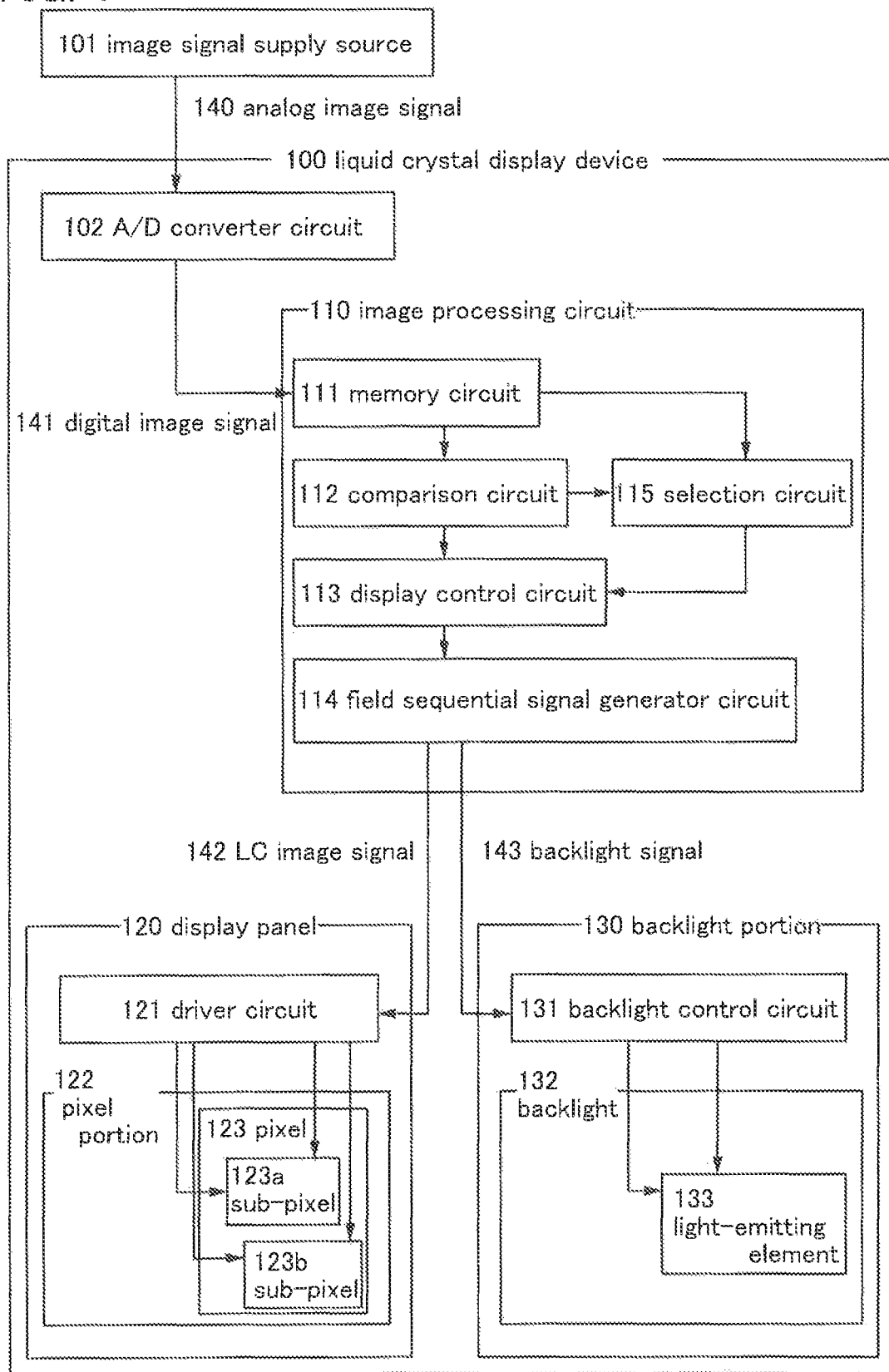
FIG. 1 is a block diagram illustrating one embodiment of a liquid crystal display device.

A liquid crystal display device 100 of this embodiment includes an A/D converter circuit 102, an image processing circuit 110, a display panel 120, and a backlight portion 130 (see FIG. 1).

The image processing circuit 110 includes a memory circuit 111, a comparison circuit 112, a selection circuit 115, a display control circuit 113, and a field sequential signal generator circuit 114.

The display panel 120 includes a driver circuit 121 and a pixel portion 122. The pixel portion 122 includes a pixel 123. The pixel 123 includes a first sub-pixel 123a connected to a first scan line and a first signal line and a second sub-pixel 123b connected to a second scan line and a second signal line. The sub-pixel 123a and the sub-pixel 123b are paired, and a plurality of the pairs is arranged in matrix as the pixel 123 in the pixel portion 122.

The sub-pixel 123a includes a first transistor, a pixel electrode connected to the first transistor, and a capacitor. A liquid crystal layer is sandwiched between the pixel electrode and a counter electrode facing the pixel electrode to form a liquid crystal element. The pixel electrode has a light-transmitting property. Note that in this specification, an electrode having a light-transmitting property, through which visible light passes, is also referred to as a light-transmitting electrode or a transparent electrode.

The sub-pixel 123b includes a second transistor, a pixel electrode connected to the second transistor, and a capacitor. A liquid crystal layer is sandwiched between the pixel electrode and a counter electrode facing the pixel electrode to form a liquid crystal element. The pixel electrode reflects incident light through the liquid crystal layer.

An example of liquid crystal elements is an element which controls transmission and non-transmission of light by optical modulation action of liquid crystals. The element can include a pair of electrodes and a liquid crystal layer. The optical modulation action of liquid crystals is controlled by an electric field applied to the liquid crystals (that is, a vertical electric field). Note that specifically, the following can be used for a liquid crystal element, for example: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like. In addition, the following can be used as a diving method of a liquid crystal: a TN (twisted nematic) mode, an STN (super twisted nematic) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, a guest-host mode, and the like.

The backlight portion 130 includes a backlight control circuit 131 and a backlight 132. The backlight 132 includes a light-emitting element 133.

In this embodiment, the backlight 132 includes a plurality of light-emitting elements 133 which emit light of different colors. As a combination of light of different colors, for example, light-emitting elements which emit light of three colors (red (R), green (G), and blue (B)) can be used. Three primary colors of R, G, and B are used, whereby a full-color image can be displayed.

Another light-emitting element which emits a color exhibited by making a plurality of light-emitting elements selected from the light-emitting elements of R, G, and B emit light at the same time (for example, yellow (Y) exhibited by R and G, cyan (C) exhibited by G and B, magenta (M) exhibited by B and R, or the like) may be provided in addition to the light-emitting elements of R, G, and B.

A light-emitting element which emits light of a color other than the three primary colors may be added, so that color reproduction characteristics of the display device are improved. A color which can be exhibited using the light-emitting elements of R, G, and B is limited to a color represented inside a triangle made by three points on the chromaticity diagram, each corresponding to the emission color of each of the light-emitting elements. Therefore, another light-emitting element of a color positioned outside the triangle on the chromaticity diagram is added, whereby color reproduction characteristics of the display device can be improved.

For example, a light-emitting element emitting the following color can be used in addition to the light-emitting elements of R, G, and B in the backlight 132: deep blue (DB) represented by a certain coordinate point positioned outside the triangle in a direction from the center of the chromaticity diagram toward a point on the chromaticity diagram corresponding to the blue-light-emitting element B or deep red (DR) represented by a certain coordinate point positioned outside the triangle in a direction from the center of the chromaticity diagram toward a point on the chromaticity diagram corresponding to the red-light-emitting element R.

Next, a signal flow in the display device described in this embodiment will be described.

An analog image signal 140 is input to the liquid crystal display device 100 from an image signal supply source 101. The analog image signal includes an image signal such as a signal corresponding to red (R), a signal corresponding to green (G), and a signal corresponding to blue (B).

The A/D converter circuit 102 converts the analog image signal into a digital image signal 141 (digital image signal Data) and outputs the signal to the image processing circuit 110. When the image signal is converted into a digital signal in advance, detection of a difference of the image signals that is to be performed later can be easily performed, which is preferable.

The image processing circuit 110 generates an LC image signal 142 and a backlight signal 143 from the digital image signal Data which is input. The LC image signal 142 is an image signal used for controlling the display panel 120, and the backlight signal 143 is a signal used for controlling the backlight portion 130.

The memory circuit 111 provided in the image processing circuit 110 includes a plurality of frame memories for storing image signals of a plurality of frames. The number of frame memories included in the memory circuit 111 is not particularly limited as long as the image signals of a plurality of frames can be stored. Note that the frame memory may be formed using a memory element such as dynamic random access memory (DRAM) or static random access memory (SRAM).

The number of frame memories is not particularly limited as long as the image signal can be stored for each frame period. Further, the image signals stored in the frame memories are selectively read out by the comparison circuit 112 and the display control circuit 113.

The comparison circuit 112 selectively reads out the image signals in successive frame periods stored in the memory circuit 111, compares the image signals in the successive frame periods in each pixel, and detects a difference thereof.

Depending on whether a difference is detected, operations in the display control circuit 113 and a selection circuit 115 are determined. When a difference is detected in any of the pixels by comparing the image signals in the comparison circuit 112, successive frame periods during which the difference is detected are determined as a moving image period. On the other hand, when a difference is not detected in all the pixels by comparing the image signals in the comparison circuit 112, successive frame periods during which no difference is detected are determined as a still image period. In other words, depending on whether a difference is detected by the comparison circuit 112, whether the image signals in the successive frame periods are image signals for displaying a moving image or image signals for displaying a still image is determined by the comparison circuit 112.

The difference obtained by the comparison may be set so as to be determined as a difference to be detected when it is over a predetermined level. The comparison circuit 112 may be set so as to determine detection of a difference by the absolute value of the difference regardless of the value of the difference.

Note that in this embodiment, a still image or a moving image is determined by detecting a difference between the image signals in successive frame periods with the comparison circuit 112; however, a signal used for switching between the still image and the moving image may be supplied externally, so that the still image or the moving image may be displayed in accordance with the switching signal.

Note that by switching of a plurality of images which is time-divided into a plurality of frames at high speed, the images are recognized as a motion image by human eyes. Specifically, by switching of images at least 60 times (60 frames) per second, the images are recognized as a moving image with less flicker by human eyes. In contrast, unlike a moving image, a still image refers to image signals which do not change in successive frame periods, for example, in an n-th frame and an (n+1)th frame though a plurality of images which is time-divided into a plurality of frame periods is switched at high speed.

The selection circuit 115 includes a plurality of switches, for example, switches formed using transistors. The selection circuit 115 selects the image signals from the frame memories in the memory circuit 111 where the image signals are stored, and the selection circuit 115 outputs the image signals to the display control circuit 113 when a difference is detected by calculation with the comparison circuit 112, that is, when images displayed in successive frame periods are a moving image.

Note that the selection circuit 115 does not output the image signals to the display control circuit 113 when a difference between the image signals is not detected by calculation with the comparison circuit 112, that is, when images displayed in successive frame periods are a still image. When a still image is displayed, the selection circuit 115 does not output the image signals from the frame memories to the display control circuit 113, resulting in a reduction in power consumption.

In the display device of this embodiment, a mode performed in such a way that the comparison circuit 112 determines the image signals as a still image is described as the still-image mode, and a mode performed in such a way that the comparison circuit 112 determines the image signals as a moving image is described as the moving-image mode.

The image processing circuit described in this embodiment may have a mode-switching function. The mode-switching function is a function of switching between the moving-image mode and the still-image mode in such a manner that a user of the display device selects an operation mode of the display device by hand or using an external connection device.

Accordingly, the display device described in this embodiment may include a mode-switching circuit. The mode-switching circuit is connected to the selection circuit 115. The mode-switching circuit is an input means for switching the operation mode of the display device by a user of the display device by hand or using an external connection device.

The selection circuit 115 can output the image signals to the display control circuit 113 in accordance with signals input from the mode-switching circuit.

For example, in the case where a user switches an operation mode and a mode-switching signal is input to the selection circuit 115 from the mode-switching circuit while an operation is performed in a still-image display mode, even when the comparison circuit 112 does not detect the difference of image signals in successive frame periods, the user can carry out a mode in which an image signal which is input is sequentially output to the display control circuit 113, that is, a moving-image mode. In the case where a user switches an operation mode and a mode-switching signal is input to the selection circuit 115 from the mode-switching circuit while an operation is performed in a moving-image mode, even when the comparison circuit 112 detects the difference of the image signals in successive frame periods, the user can carry out a mode in which only an image signal of one selected frame is output, that is, a still-image mode. Therefore, when the display device of this embodiment is operated in the moving-image mode, one frame among images which are time-divided into a plurality of frames is displayed as a still image.

The display control circuit 113 optimizes an image signal selected by the selection circuit 115 in accordance with detection of the difference in the comparison circuit 112 for the display panel 120 and the backlight portion 130.

For example, even when the digital image signal 141 is formed of signals of R, G, and B, it is preferable that the image signal be optimized in accordance with the light-emitting properties of the light-emitting elements of R, G, and B included in the backlight 132. In the case where the backlight 132 is provided with a light-emitting element other than the light-emitting elements of R, G, and B, the display control circuit 113 generates a signal used for driving the light-emitting element from the original image signal, and color reproduction characteristics of the display device is optimized.

For example, in the case where a digital image signal Data(1) formed of R, G, and B is converted into a digital image signal Data(4) suitable for the backlight 132 provided with light-emitting elements of five colors (R, G, B, DR, and DB), the display control circuit 113 generates a digital image signal Data(2) expressed using the light-emitting elements of DR and DB from the original digital image signal Data(1). At the same time, the digital image signal Data(2) expressed using the light-emitting elements of DR and DB is extracted from the original digital image signal Data(1), and a digital image signal Data(3) is generated. Next, the digital image signal Data(4), which is optimized for the backlight 132 provided with the light-emitting elements of five colors (R, G B, DR, and DB) and which includes the digital image signal Data(2) expressed using the light-emitting elements of DR and DB and the digital image signal Data(3) expressed using the light-emitting elements of R, G, and B, is generated.

The display device described in this embodiment includes the first sub-pixel 123a connected to the first signal line and the second sub-pixel 123b connected to the second signal line. The display control circuit 113 determines a signal line which outputs an image signal.

Specifically, when the comparison circuit 112 determines that an image signal is a moving image, the display control circuit 113 outputs the image signal to the first sub-pixel 123a. When the comparison circuit 112 determines that an image signals is a still image, the display control circuit 113 outputs the image signal to the second sub-pixel 123b.

The field sequential signal generator circuit 114 controls the driver circuit 121 of the display panel 120 and the backlight control circuit 131 of the backlight portion 130 based on an image signal generated by the display control circuit 113.

In addition, the field sequential signal generator circuit 114 controls the switching of supply and stop of control signals such as a start pulse SP and a clock signal CK which are used for synchronizing the display panel 120 and the backlight portion 130.

Next, a method by which the field sequential signal generator circuit 114 controls the driver circuit 121 of the display panel 120 and the backlight control circuit 131 of the backlight portion 130 will be described. The operation of the field sequential signal generator circuit 114 differs between the case where the comparison circuit 112 determines that an image signal is a moving image and the case where the comparison circuit 112 determines that an image signals is a still image. In this embodiment, the image signal is formed of R, G, and B, and the backlight 132 includes light-emitting elements (specifically, LEDs) of R, G, and B.

First, the operation of the field sequential signal generator circuit 114 when the comparison circuit 112 determines that an image signal is a moving image will be described. In the field sequential signal generation circuit 114, an image signal including a moving image is processed in a moving-image mode. Specifically, the field sequential signal generation circuit 114 compresses each image signal optimized by the display control circuit 113 by $1/(3n)$ with respect to the time axis. Note that n corresponds to the n used in the case where one frame is divided into n sub-frames. Then, a field sequential color image signal (e.g., R1, G1, B1, R2, G2, and B2) is supplied to the driver circuit 121, which correspond to R, G, and B compressed by $1/(3n)$ with respect to the time axis.

The field sequential signal generator circuit 114 supplies the backlight signal 143 to the backlight 132. The backlight signal 143 makes the light-emitting elements of R, G, and B provided in the backlight 132 emit light, and the backlight signal 143 is paired with the field sequential color image signal which correspond to R, G, and B.

The display panel 120 and the backlight portion 130 operate in synchronization with a synchronization signal generated by the field sequential signal generator circuit 114, whereby a moving image is displayed.

On the other hand, when the comparison circuit 112 determines that an image signal is a still image, the field sequential signal generator circuit 114 does not generate the field sequential color image signal but supplies still image data for one frame to the driver circuit 121 of the display panel 120.

Then, the field sequential signal generator circuit 114 stops the supply of the image signal and the control signals to the driver circuit 121 and the backlight control circuit 131.

The display device described in this embodiment may include a photometric circuit. The display device provided with the photometric circuit can detect the brightness of the environment where the display device is put. As a result, the display control circuit 113 connected to the photometric circuit can change a driving method of the display panel 120 in accordance with a signal input from the photometric circuit.

For example, when the photometric circuit detects the display device described in this embodiment which is used in a dim environment, the display control circuit 113 outputs an image signal to the first sub-pixel 123a and the backlight 132 is turned on even when the comparison circuit 112 determines that an image signal is a still image. Since the first sub-pixel 123a includes the light-transmitting pixel electrode, a still image with high visibility can be provided using the backlight.

For example, when the photometric circuit detects the display device described in this embodiment which is used under extremely bright external light (e.g., under direct sunlight outdoors), the display control circuit 113 outputs an image signal to the second sub-pixel 123b even when the comparison circuit 112 determines that an image signals is a moving image. Since the second sub-pixel 123b includes a pixel electrode which reflects incident light through the liquid crystal layer, a still image with high visibility can be provided even under extremely bright external light.

In a period in which a still image is displayed using the structure of this embodiment, frequent writings of the image signal can be reduced. In addition, power consumption is extremely low because the still image can be displayed without use of the backlight.

The display device described in this embodiment can display not only a still image with reduced power consumption but also a full-color image and a moving image without use of a color filter. Since the color filter does not absorb light of the backlight, light use efficiency is high, and power consumption is suppressed even when the full-color image and the moving image are displayed.

When human eyes see an image formed by writing the image signal plural times, the human eyes see images which are switched plural times, which might cause eye strain. As described in this embodiment, the number of writings of the image signal is reduced, whereby there is an effect of reducing eye strain.

This embodiment can be combined with any of the other embodiments in this specification, as appropriate.

Embodiment 2

Figure 2:
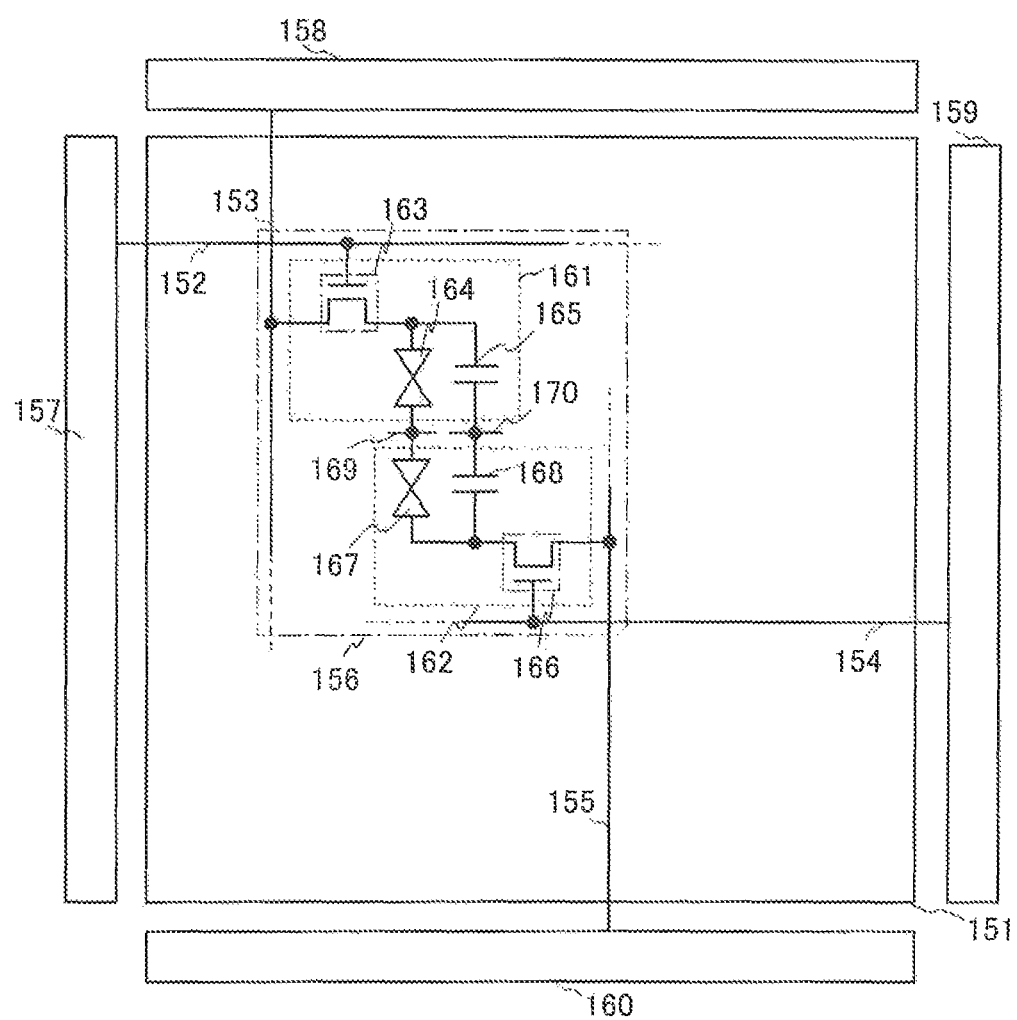
FIG. 2 is a diagram illustrating one embodiment of a liquid crystal display device.

In this embodiment, a driving method of a liquid crystal display device will be described using a pixel connection diagram, a timing chart, and the like. First, FIG. 2 is a schematic view of a display panel of a liquid crystal display device. In FIG. 2, the display panel includes a pixel portion 151, a first scan line 152 (also referred to as a gate line), a first signal line 153 (also referred to as a data line), a second scan line 154, a second signal line 155, a pixel 156, a common electrode 169, a capacitor line 170, a first scan line driver circuit 157, a first signal line driver circuit 158, a second scan line driver circuit 159, and a second signal line driver circuit 160.

The pixel 156 is roughly divided into a light-transmitting electrode portion 161 and a reflective electrode portion 162. The light-transmitting electrode portion 161 includes a pixel transistor 163, a liquid crystal element 164, and a capacitor 165. A gate of the pixel transistor 163 is connected to the first scan line 152, a first terminal serving as one of a source and a drain of the pixel transistor 163 is connected to the first signal line 153, and a second terminal serving as the other of the source and the drain of the pixel transistor 163 is connected to one electrode of the liquid crystal element 164 and a first electrode of the capacitor 165. The other electrode of the liquid crystal element 164 is connected to the common electrode 169. A second electrode of the capacitor 165 is connected to the capacitor line 170.

The reflective electrode portion 162 includes a pixel transistor 166, a liquid crystal element 167, and a capacitor 168. A gate of the pixel transistor 166 is connected to the second scan line 154, a first terminal serving as one of a source and a drain of the pixel transistor 166 is connected to the second signal line 155, a second terminal serving as the other of the source and the drain of the pixel transistor 166 is connected to one electrode of the liquid crystal element 167 and a first electrode of the capacitor 168. The other electrode of the liquid crystal element 167 is connected to the common electrode 169. A second electrode of the capacitor 168 is connected to the capacitor line 170.

In FIG. 2, the first scan line 152 and the second scan line 154 are separately driven by the first scan line driver circuit 157 and the second scan line driver circuit 159, respectively. Respective image signals (hereinafter referred to as first data and second data) are supplied to the first signal line 153 and the second signal line 155 by the first signal line driver circuit 158 and the second signal line driver circuit 160, respectively. Grayscales based on different image signals are controlled in the liquid crystal element 164 of the light-transmitting electrode portion 161 and the liquid crystal element 167 of the reflective electrode portion 162.

The pixel transistor 163 and the pixel transistor 166 are preferably formed using thin film transistors (hereinafter also referred to as TFTs) having a thin oxide semiconductor layer.

Note that a thin film transistor is an element having at least three terminals of gate, drain, and source. The thin film transistor includes a channel region between a drain region and a source region, and current can flow through the drain region, the channel region, and the source region. Here, since the source and the drain may change depending on the structure, the operating condition, and the like of the transistor, it is difficult to define which is a source or a drain. Therefore, in this document (the specification, the claims, the drawings, and the like), a region functioning as a source and a drain is not called the source or the drain in some cases. In such a case, for example, one of the source and the drain may be referred to as a first terminal and the other thereof may be referred to as a second terminal. Alternatively, one of the source and the drain may be referred to as a first electrode and the other thereof may be referred to as a second electrode. Further alternatively, one of the source and the drain may be referred to as a source region and the other thereof may be referred to as a drain region.

The first scan line driver circuit 157, the first signal line driver circuit 158, the second scan line driver circuit 159, and the second signal line driver circuit 160 are preferably provided over the substrate over which the pixel portion 151 is formed; however, these are not necessarily formed over the substrate over which the pixel portion 151 is formed. When the first scan line driver circuit 157, the first signal line driver circuit 158, the second scan line driver circuit 159, and the second signal line driver circuit 160 are provided over the substrate over which the pixel portion 151 is formed, the number of the connection terminals for connection to the outside and the size of the liquid crystal display device can be reduced.

Note that the pixels 156 are provided (arranged) in matrix. Here, description that pixels are provided (arranged) in matrix includes the case where the pixels are arranged in a straight line and the case where the pixels are arranged in a jagged line, in a longitudinal direction or a lateral direction.

Note that when it is explicitly described that "A and B are connected," the case where A and B are electrically connected, the case where A and B are functionally connected, and the case where A and B are directly connected are included therein.

Next, the operation of the display panel together with the operation of the backlight will be described with reference to FIG. 3A. As described in the above embodiment, the operation of the display panel is roughly divided into a moving-image display period 301 and a still-image display period 302.

The cycle of one frame period (or frame frequency) is preferably less than or equal to 1/60 sec (more than or equal to 60 Hz) in the moving-image display period 301. The frame frequency is increased, so that flickering is not sensed by a viewer of an image. In the still-image display period 302, the cycle of one frame period is extremely long, for example, longer than or equal to one minute (less than or equal to 0.017 Hz), so that eye strain can be reduced compared to the case where the same image is switched plural times.

When an oxide semiconductor is used for a semiconductor layer of the pixel transistor 163 and the pixel transistor 166, the off-state current can be reduced. Accordingly, an electrical signal such as the image signal can be held for a longer period in the pixel, and a writing interval can be set long. Therefore, the cycle of one frame period can be increased, and the frequency of refresh operation in the still-image display period 302 can be reduced, whereby an effect of suppressing power consumption can be further increased.

As described in the above embodiment, in the moving-image display period 301 illustrated in FIG. 3A, driver circuit control signals for displaying a moving image by field sequential driving are supplied to the first scan line driver circuit 157 and the first signal line driver circuit 158 (hereinafter referred to as the first driver circuits), and driver circuit control signals for displaying black in each pixel are supplied to the second scan line driver circuit 159 and the second signal line driver circuit 160 (hereinafter referred to as the second driver circuits), whereby the first driver circuits and the second driver circuits operate. In the moving-image display period 301 illustrated in FIG. 3A, the backlight signal 143 for performing color display is supplied to the backlight by the field sequential driving, so that the backlight operates. Then, a color moving image can be displayed on the display panel.

Figure 3A:
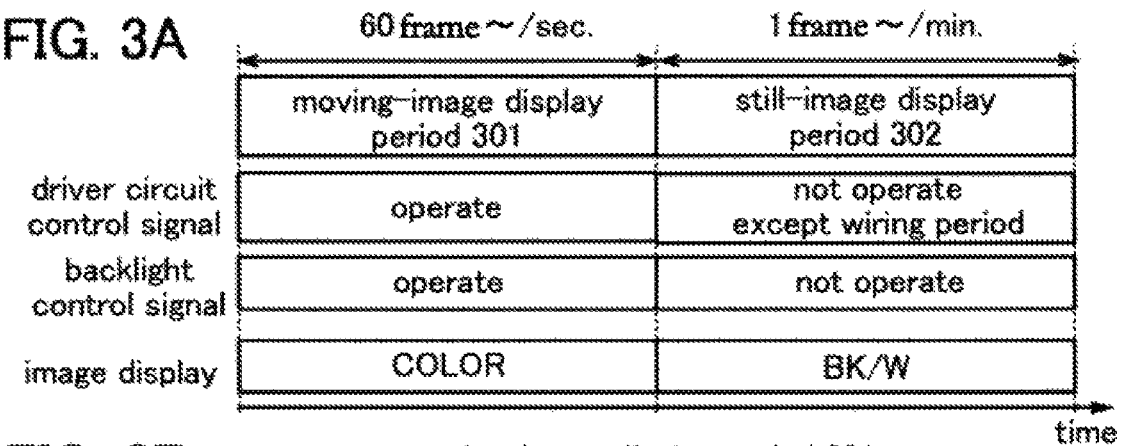
FIGS. 3A to 3C are diagrams illustrating one embodiment of a driving method of a liquid crystal display device.

As described in the above embodiment, in the still-image display period 302 illustrated in FIG. 3A, driver circuit control signals for writing the image signals of a still image are supplied to the second driver circuits because a monochrome grayscale (in the diagram, described as BK/W) is displayed due to transmission or non-transmission of reflected light, whereby the second driver circuits operate. When the driver circuit control signals are not supplied to the second driver circuits in the period other than the period of writing the image signals, power consumption can be reduced. In the still-image display period 302 illustrated in FIG. 3A, display comes to be visible utilizing reflected external light; therefore, the backlight is not operated by the backlight control signals. Then, a still image with a monochrome grayscale can be displayed on the display panel.

Figure 3B:
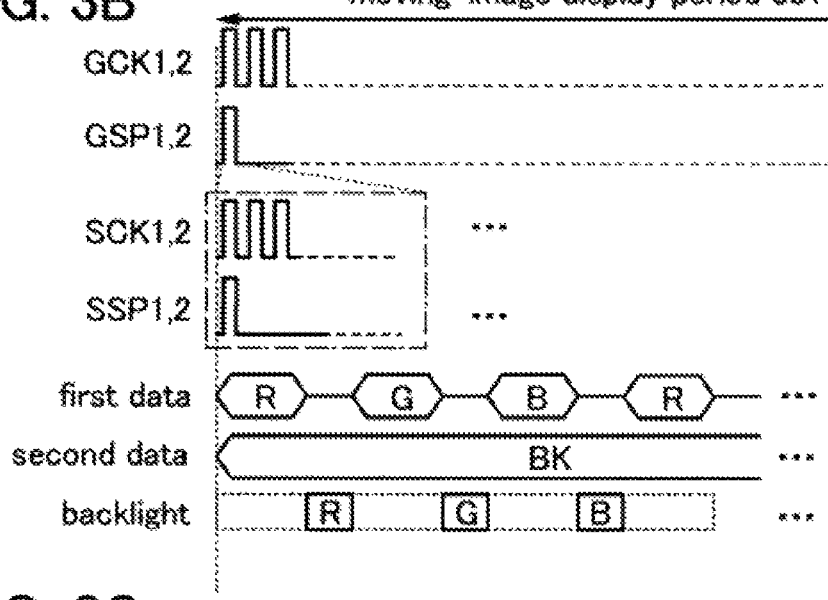
Figure 3C:
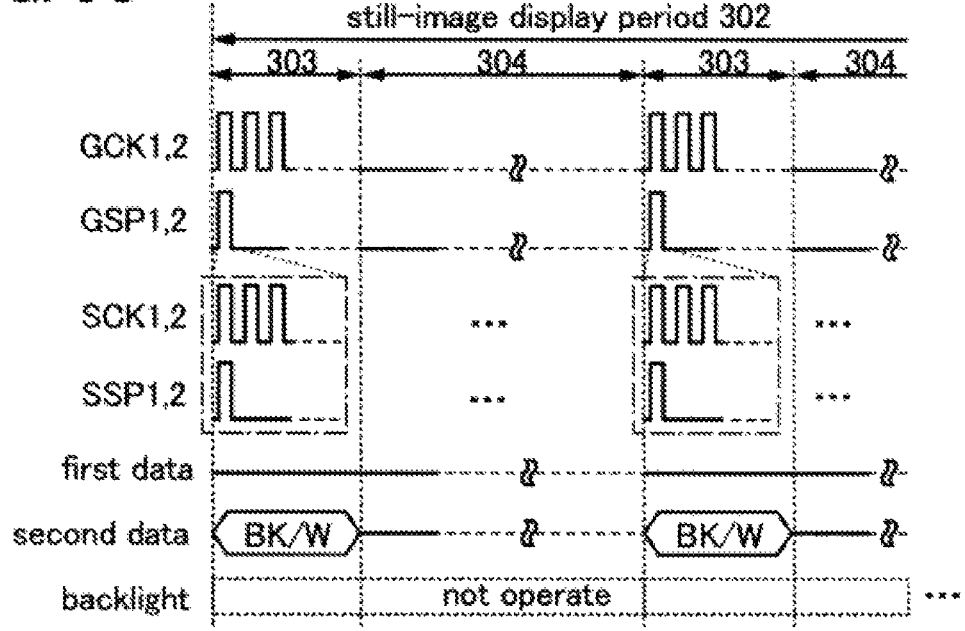

Next, the moving-image display period 301 and the still-image display period 302 of FIG. 3A will be described in details with reference to timing charts of FIG. 3B and FIG. 3C, respectively. The timing charts illustrated in FIG. 3B and FIG. 3C are exaggerated for description, and signals do not operate in synchronization, except for the case where there is specific description.

First, FIG. 3B will be described. FIG. 3B illustrates clock signals GCK (in the diagram, GCK1 and GCK2) which are supplied to the first scan line driver circuit 157 and the second scan line driver circuit 159, start pulses GSP (in the diagram, GSP1 and GSP2) which are supplied to the first scan line driver circuit 157 and the second scan line driver circuit 159, clock signals SCK (in the diagram, SCK1 and SCK2) which are supplied to the first signal line driver circuit 158 and the second signal line driver circuit 160, start pulses SSP (in the diagram, SSP1 and SSP2) which are supplied to the first signal line driver circuit 158 and the second signal line driver circuit 160, the first data, the second data, and a lighting state of the backlight in the moving-image display period 301 as an example. As the backlight, a structure in which three colors of RGB are sequentially emitted as an example of a plurality of light-emitting elements will be described. Low power consumption and life extension can be attempted using an LED as the backlight.

In the moving-image display period 301, each of the clock signals GCK1 and GCK2 serves as a clock signal which is always supplied. Each of the start pulses GSP1 and GSP2 serves as a pulse corresponding to vertical synchronization frequency. Each of the clock signals SCK1 and SCK2 serves as a clock signal which is always supplied. Each of the start pulses SSP1 and SSP2 serves as a pulse corresponding to one gate selection period. A moving image is displayed by field sequential driving in the moving-image display period 301. Therefore, image signals are changed as follows: an image signal for displaying R (red) is written to each pixel, the backlight of R is turned on, an image signal for displaying G (green) is written to each pixel, the backlight of G is turned on, an image signal for displaying B (blue) is written to each pixel, and the backlight of B is turned on. The above operation is repeated to change the image signals, whereby a viewer can see color display of a moving image. In the moving-image display period 301, the second data is an image signal for displaying a grayscale of BK (black) and is written to the reflective electrode portion 162 of the pixel 156. When the second data is used as an image signal for displaying black, the reflective electrode portion 162 is irradiated with external light. Therefore, the visibility problem of a moving image of the light-transmitting electrode portion 161 such that light leakage occurs and visibility is reduced can be remedied.

Next, FIG. 3C will be described. In FIG. 3C, the still-image display period 302 is divided into a still-image writing period 303 and a still-image holding period 304.

In the still-image writing period 303, the clock signal GCK2 supplied to the second scan line driver circuit 159 serves as a clock signal for writing for one screen. The start pulse GSP2 supplied to the second scan line driver circuit 159 serves as a pulse for writing for one screen. The clock signal SCK2 supplied to the second signal line driver circuit 160 serves as a clock signal for writing for one screen. The start pulse SSP2 supplied to the second signal line driver circuit 160 serves as a pulse for writing for one screen. In the still-image writing period 303, a still image is displayed using the image signal BK/W for displaying a monochrome grayscale utilizing reflected light; therefore, the backlight for color display is not turned on.

In the still-image holding period 304, supply of the clock signals GCK1 and GCK2, the start pulses GSP1 and GSP2, the clock signals SCK1 and SCK2, and the start pulses SSP1 and SSP2 which are used for driving the first driver circuits and the second driver circuits is stopped. Therefore, in the still-image holding period 304, power consumption can be reduced. In the still-image holding period 304, the image signals written to the pixel in the still-image writing period 303 are held by the pixel transistor with extremely low off-state current; therefore, a color still image can be held for longer than or equal to one minute. In the still-image holding period 304, before the image signal held in the capacitor is changed as a given period passes, another still-image writing period 303 is provided, and an image signal which is the same as the image signal of the previous period is written (refresh operation), and the still-image holding period 304 may be provided again.

In the liquid crystal display device described in this embodiment, power consumption can be reduced when a still image is displayed.

This embodiment can be implemented in combination with the structure described in Embodiment 1, as appropriate.

Embodiment 3

In this embodiment, a driving method which is different from the driving method of the liquid crystal display device described in Embodiment 2 will be described with reference to a timing chart and the like. First, a driving method of the backlight in the moving-image display period 301 described in Embodiment 2 will be described using a timing chart in FIG. 4A.

Figure 4A:
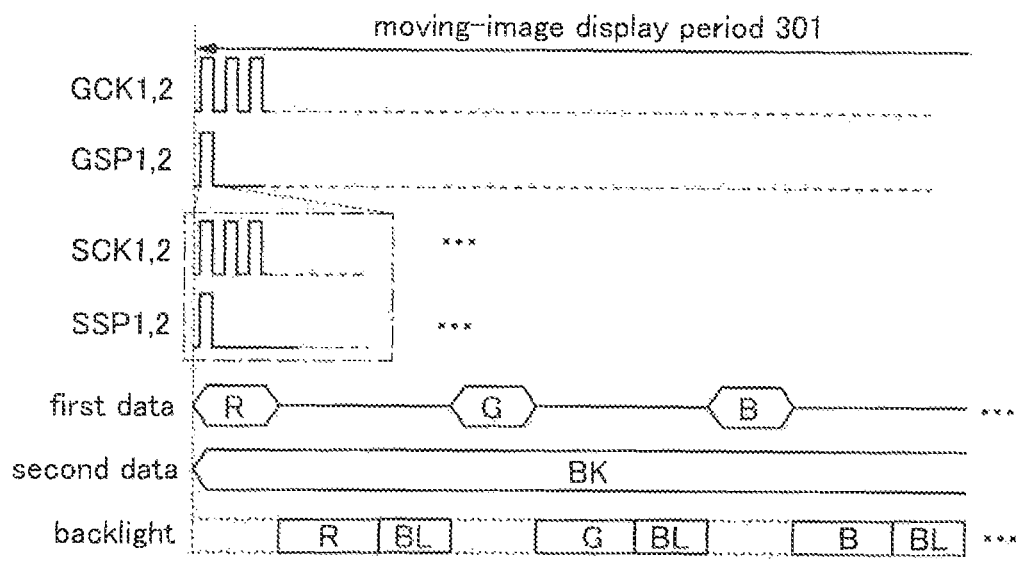
FIGS. 4A and 4B are diagrams illustrating one embodiment of a driving method of a liquid crystal display device.

The timing chart in FIG. 4A is different from that of FIG. 3B in that a non-lighting period (BL of FIG. 4A) of the backlight is provided after the backlight is turned on, following the writing of the image signal. The non-lighting period of the backlight is provided before writing of the next image signal, so that a flicker of color or the like can be reduced and visibility can be improved.

Figure 4B:
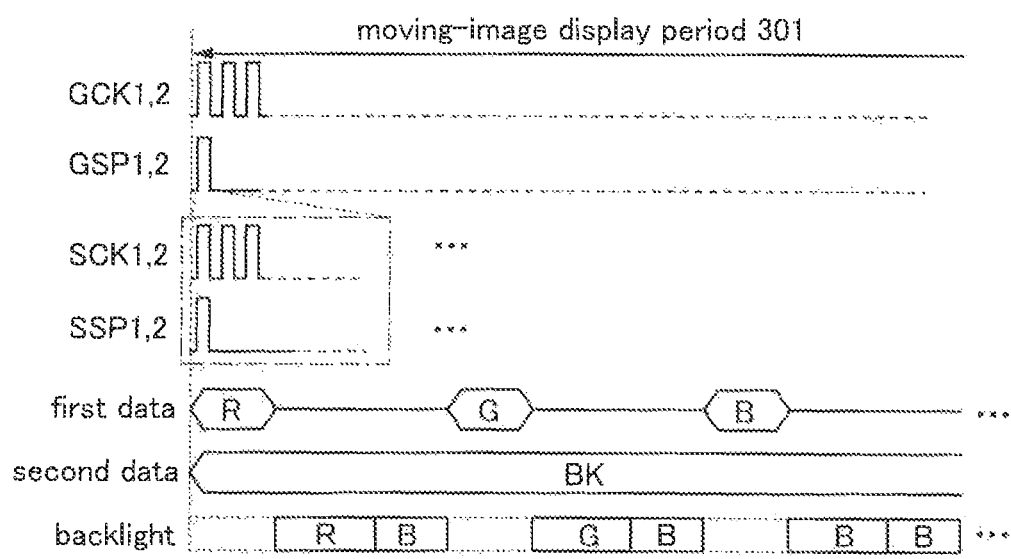

FIG. 4B illustrates a structure different from that in FIG. 4A. The timing chart in FIG. 4B is different from that of FIG. 4A in that a B (blue) light-emitting period is provided instead of the non-lighting period BL of the backlight. In a manner similar to that of the case where the non-lighting period is provided, the blue light-emitting period is provided before writing of the next image signal, so that a flicker of color or the like can be reduced and visibility can be improved.

In Embodiment 2, the example in which three colors of RGB are used is described as an example of a plurality of light-emitting elements used for the backlight; however, another structure may be used. As an example, the backlight may be controlled using a light-emitting element 311 of five colors as illustrated in FIG. 5A.

Figure 5A:
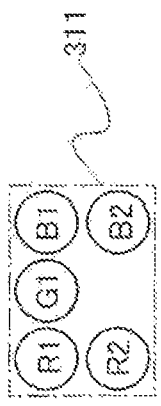
FIGS. 5A and 5B are diagrams illustrating one embodiment of a driving method of a liquid crystal display device.

FIG. 5A illustrates the light-emitting element 311 including a first red light-emitting element R1, a second red light-emitting element R2, a green light-emitting element G, a first blue light-emitting element B1, and a second blue light-emitting element B2 as an example Next in FIG. 5B, control of the lighting of the backlight illustrated in FIG. 5A in the moving-image display period 301 described in Embodiment 2 will be described, similarly to the descriptions of FIGS. 4A and 4B.

Figure 5B:
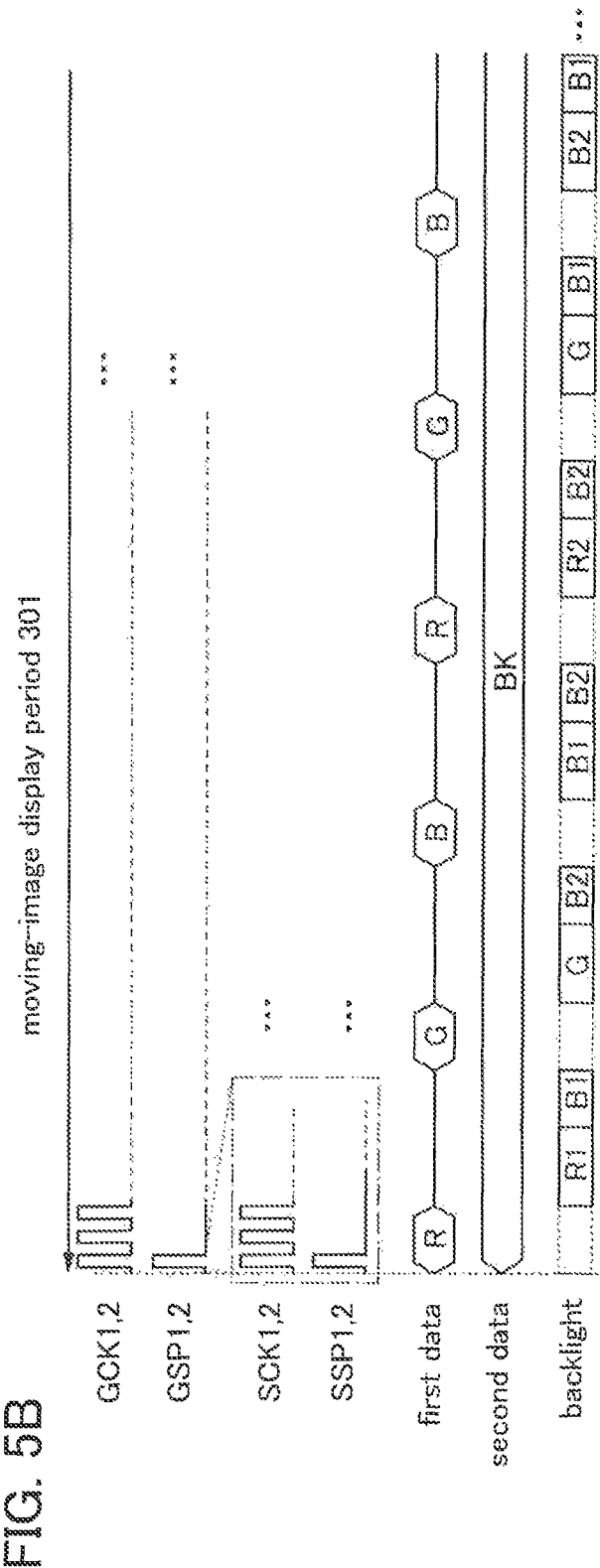

In FIG. 5B, the first red light-emitting element R1 and the first blue light-emitting element B1 emit light as the lighting of the backlight after the writing of the R image signal. Next, the green light-emitting element G and the second blue light-emitting element B2 emit light as the lighting of the backlight after the writing of the G image signal. Then, the first blue light-emitting element B1 and the second blue light-emitting element B2 emit light as the lighting of the backlight after the writing of the B image signal. Next, the second red light-emitting element R2 and the second blue light-emitting element B2 emit light as the lighting of the backlight after the writing of the R image signal. Then, the green light-emitting element G and the first blue light-emitting element B1 emit light as the lighting of the backlight after the writing of the G image signal. Next, the second blue light-emitting element B2 and the first blue light-emitting element B1 emit light as the lighting of the backlight after the writing of the B image signal.

With the structure of FIG. 5B, the blue light-emitting period can be provided in a period in which color elements of RGB are switched; therefore, an effect which is similar to that of FIG. 4B can be obtained. The first red light-emitting element R1 and the second red light-emitting element R2 can be formed using materials of different color coordinates and the first blue light-emitting element B1 and the second blue light-emitting element B2 can be formed using materials of different color coordinates; accordingly, color representation range can be expanded in color display.

In the liquid crystal display device described in this embodiment, lower power consumption can be achieved when a still image is displayed.

This embodiment can be implemented in combination with the structure described in Embodiment 1, as appropriate.

Embodiment 4

Figure 6:
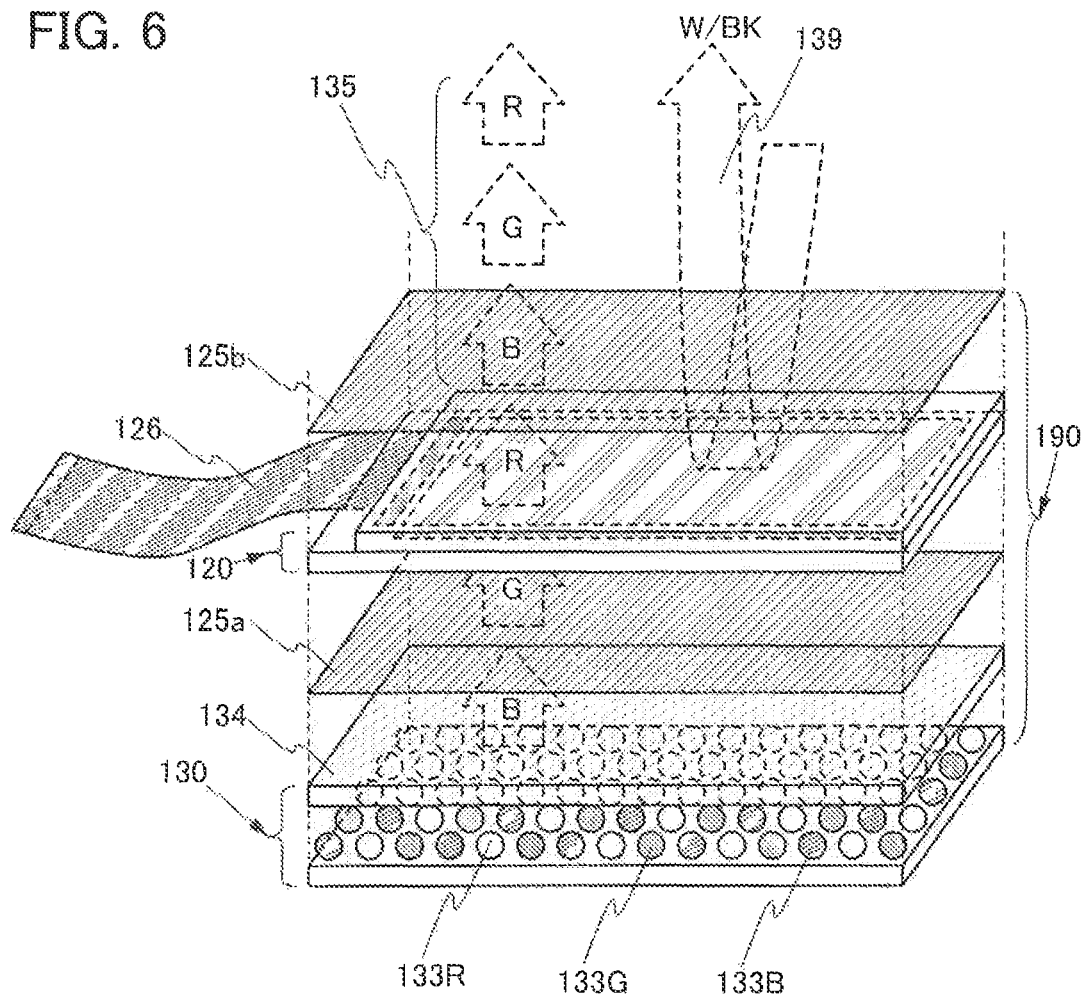
FIG. 6 is a view illustrating one embodiment of a liquid crystal display device.

FIG. 6 illustrates a structure of a liquid crystal display module 190. The liquid crystal display module 190 includes the backlight portion 130, the display panel 120 in which liquid crystal elements are arranged in matrix, and a polarizing plate 125a and a polarizing plate 125b which are provided with the display panel 120 positioned therebetween. In the backlight portion 130, light-emitting elements, for example, LEDs (133R, 133G, and 133B) of three primary colors are arranged in matrix, and the backlight portion 130 may include a diffusion plate 134 provided between the display panel 120 and the light-emitting element. In addition, a flexible printed circuit (FPC) 126 serving as an external input terminal is electrically connected to a terminal portion provided in the display panel 120.

In FIG. 6, light 135 of three colors is schematically denoted by arrows (R, G, and B). Pulsed light of different colors sequentially emitted from the backlight portion 130 is modulated by the liquid crystal element of the display panel 120 which is operated in synchronization with the backlight portion 130 to reach a viewer through the liquid crystal display module 190. The viewer perceives light which is sequentially emitted to be an image.

Further, FIG. 6 schematically illustrates a state in which external light 139 is transmitted through the liquid crystal element over the display panel 120 and reflected by an electrode below the liquid crystal element. The intensity of the light transmitted through the liquid crystal element is modulated by an image signal; therefore, a viewer can perceive an image also by the reflected light of the external light 139.

Figure 7A:
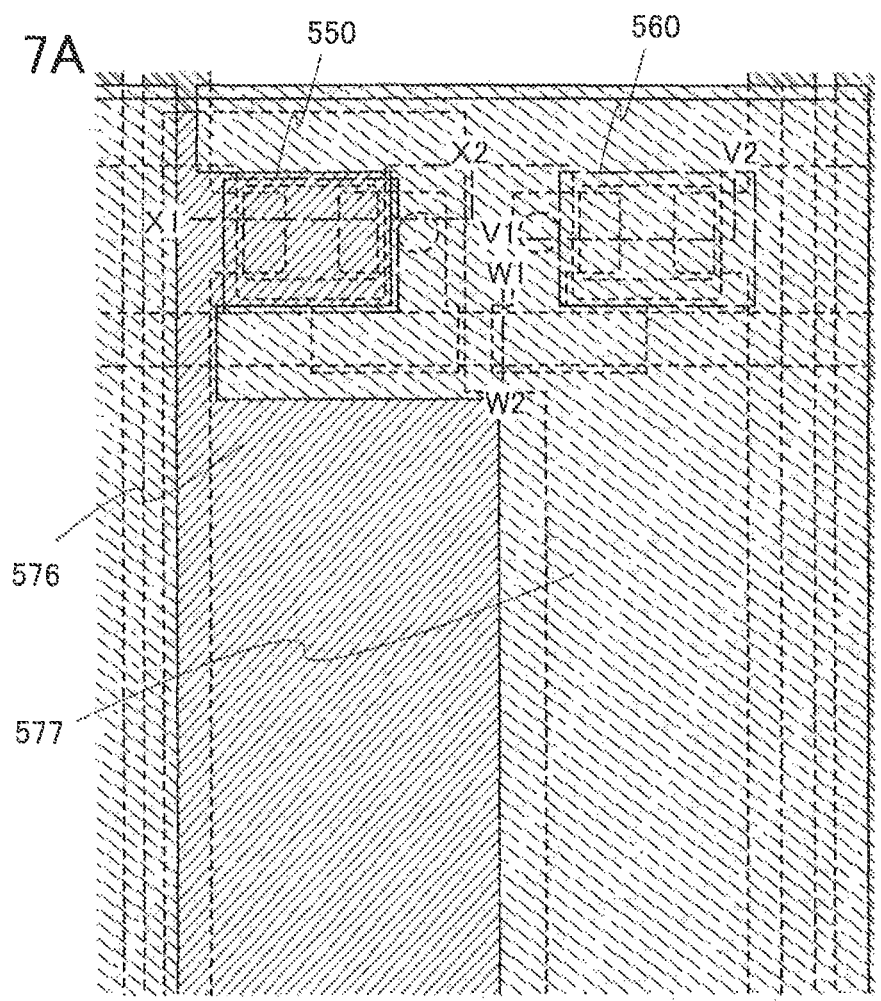
FIGS. 7A and 7B are view illustrating one embodiment of a liquid crystal display device.
Figure 7B:
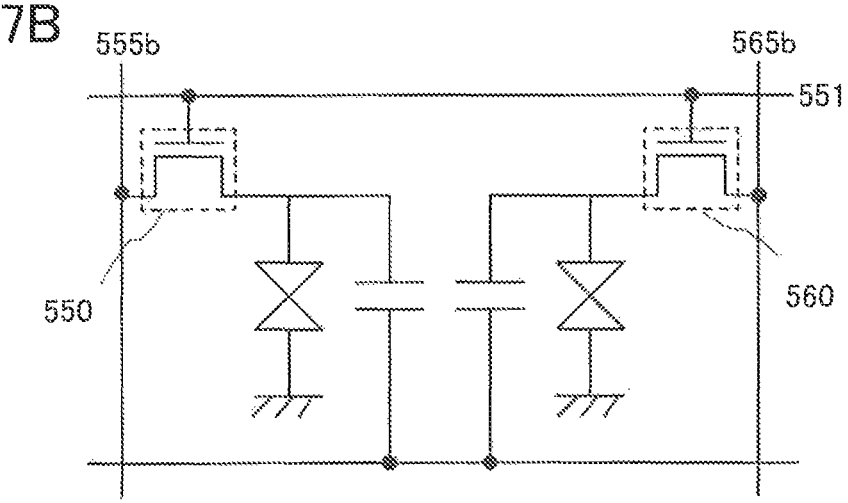
Figure 8:
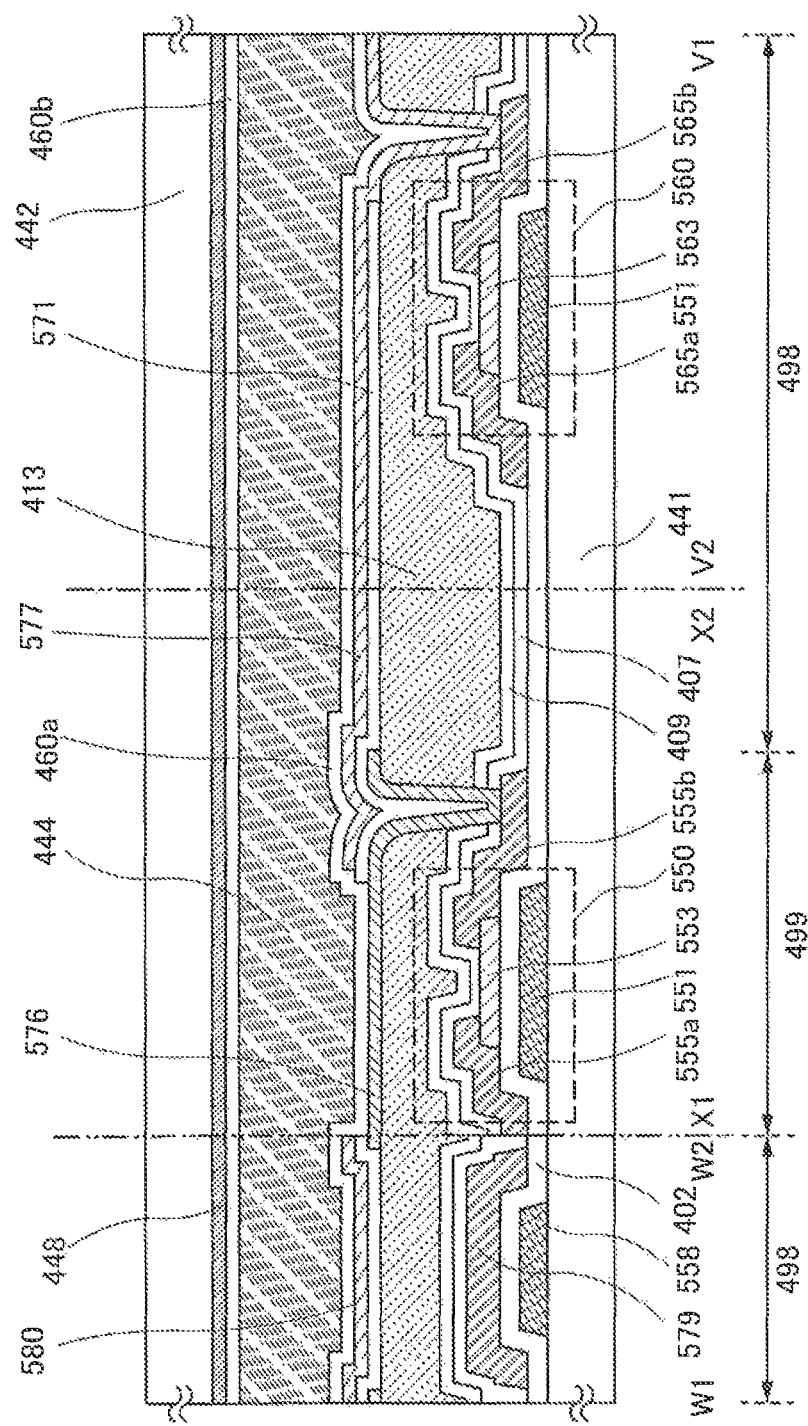
FIG. 8 is a view illustrating one embodiment of a liquid crystal display device.

FIG. 7A is a plan view of a display region, and FIG. 7B illustrates an equivalent circuit. FIGS. 7A and 7B each illustrate one pixel. FIG. 8 is a cross-sectional view taken along lines V1-V2, W1-W2, and X1-X2 of FIG. 7A.

In FIGS. 7A and 7B, a plurality of source wiring layers (including a source or drain electrode layer 555b and a source or drain electrode layer 565b) is arranged in parallel (extends in the vertical direction in the drawing) to be spaced from each other. A plurality of gate wiring layers (including a gate electrode layer 551) is provided to extend in a direction generally perpendicular to the source wiring layers (the horizontal direction in the drawing) and to be spaced from each other. Capacitor wiring layers are arranged adjacent to the plurality of gate wiring layers and extend in a direction generally parallel to the gate wiring layers, that is, in a direction generally perpendicular to the source wiring layers (in the horizontal direction in the drawing).

The liquid crystal display device in FIGS. 7A and 7B and FIG. 8 is a semi-transmissive liquid crystal display device in which a pixel region includes a reflective region 498 and a transmissive region 499. In the reflective region 498, a reflective electrode layer 577 is formed as a pixel electrode layer, and in the transmissive region 499, a transparent electrode layer 576 is formed as a pixel electrode layer. As illustrated in FIGS. 7A and 7B and FIG. 8, when the reflective electrode layer 577 and the transparent electrode layer 576 are stacked in such a way that an end portion of the reflective electrode layer 577 overlaps with an end portion of the transparent electrode layer 576 with an insulating film 571 interposed therebetween, a display region can be efficiently provided in the pixel region. Note that an example in which the transparent electrode layer 576, the insulating film 571, and the reflective electrode layer 577 are stacked in that order over an interlayer film 413 is illustrated in FIG. 8; however, a structure in which the reflective electrode layer 577, the insulating film 571, and the transparent electrode layer 576 are stacked in that order over the interlayer film 413 may be employed.

The equivalent circuit in FIG. 7B includes, in one pixel, a transistor 560 which is electrically connected to the reflective electrode layer 577 and the source or drain electrode layer 565b, and a transistor 550 which is electrically connected to the transparent electrode layer 576 and a source or drain electrode layer 555b. The transistor 560 is a transistor for the reflective region, which controls on/off of the reflective region, and the transistor 550 is a transistor for the transmissive region, which controls on/off of the transmissive region.

Insulating films 407 and 409 and the interlayer film 413 are provided over the transistors 550 and 560. The transistor 550 is electrically connected to the transparent electrode layer 576 and the transistor 560 is electrically connected to the reflective electrode layer 577 in their respective openings (contact holes) formed in the insulating films 407 and 409 and the interlayer film 413.

As illustrated in FIG. 8, a common electrode layer 448 (also referred to as a counter electrode layer) is formed on a second substrate 442 and faces the transparent electrode layer 576 and the reflective electrode layer 577 over a first substrate 441 with a liquid crystal layer 444 provided therebetween. Note that in the liquid crystal display device in FIGS. 7A and 7B and FIG. 8, an alignment film 460a is provided between the transparent electrode layer 576 and the reflective electrode layer 577, and the liquid crystal layer 444. An alignment film 460b is provided between the common electrode layer 448 and the liquid crystal layer 444. The alignment films 460a and 460b are insulating layers having a function of controlling the alignment of liquid crystal and therefore, are not necessarily provided depending on a material of the liquid crystal.

The transistors 550 and 560 are examples of bottom-gate inverted-staggered transistors. The transistor 550 includes the gate electrode layer 551, a gate insulating layer 402, a semiconductor layer 553, the source or drain electrode layer 555a, and the source or drain electrode layer 555b. The transistor 560 includes the gate electrode layer 551, the gate insulating layer 402, a semiconductor layer 563, a source or drain electrode layer 565a, and the source or drain electrode layer 565b. The transistors 550 and 560 each have a capacitor. In the reflective region 498 as illustrated in FIG. 8, the capacitor wiring layer 558 which is formed in the same step as the gate electrode layer 551, the gate insulating layer 402, and a conductive layer 579 which is formed in the same step as the source or drain electrode layers 555a, 555b, 565a, and 565b are stacked to form the capacitor. Note that it is preferable to form a wiring layer 580 formed in the same step as the reflective electrode layer 577 which is formed using a reflective conductive film of aluminum (Al), silver (Ag), or the like so as to cover the capacitor wiring layer 558.

The semi-transmissive liquid crystal display device in this embodiment displays a color moving image in the transmissive region 499 by control of turning on and off the transistor 550 and a monochrome (black and white) still image in the reflective region 498 by control of turning on and off the transistor 560. The transistor 550 and the transistor 560 are separately operated, so that display of the reflective region 498 and display of the transmissive region 499 can be controlled independently.

In the transmissive region 499, display is performed by incident light from a backlight provided on the first substrate 441 side. The light-emitting diodes (LEDs) of RGB are used for the backlight, whereby color display can be performed. In this embodiment, a successive additive color mixing system (field sequential system) in which color display is performed by time division using the light-emitting diodes (LEDs) is adopted.

On the other hand, in the reflective region 498, display is performed by reflecting external light incident from the second substrate 442 side by the reflective electrode layer 577.

Figure 9:
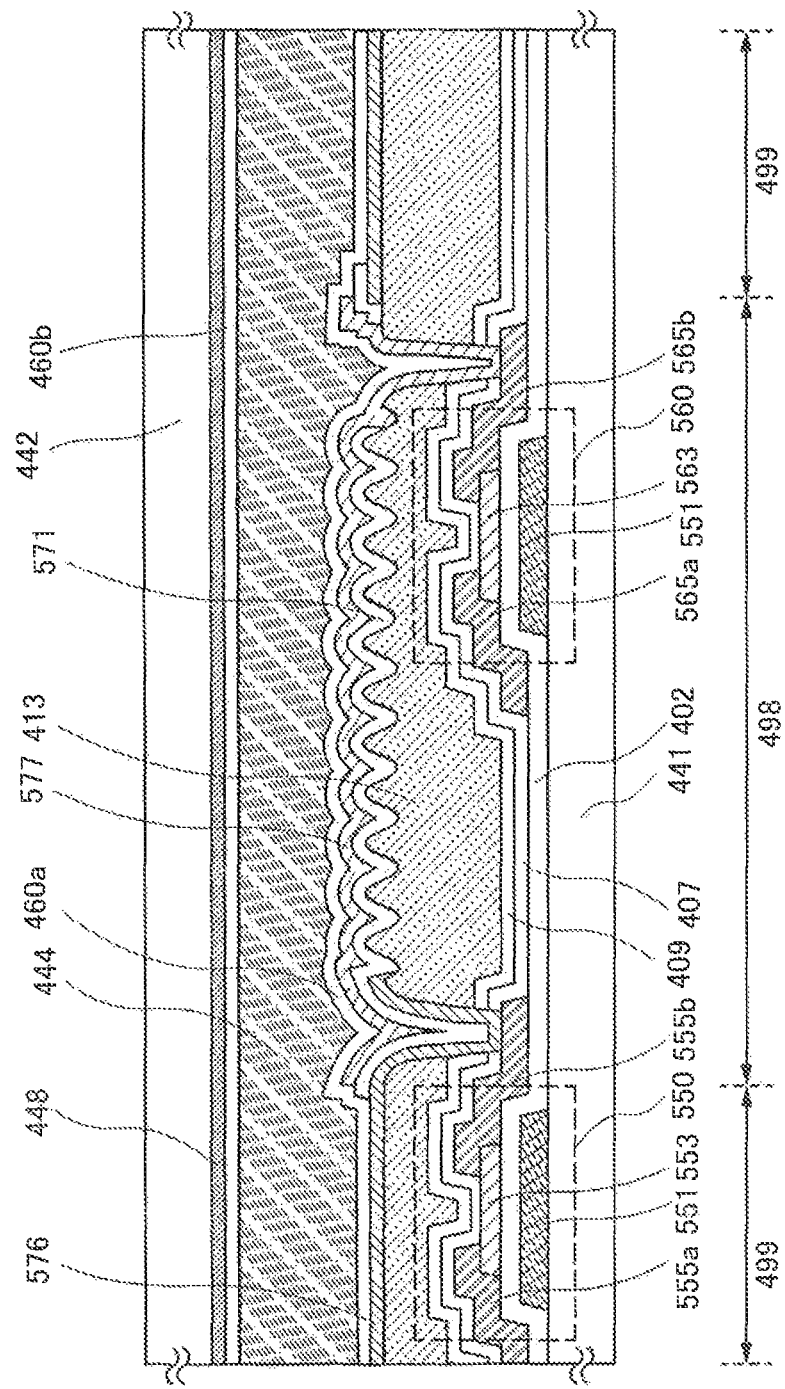
FIG. 9 is a view illustrating one embodiment of a liquid crystal display device.
Figure 10:
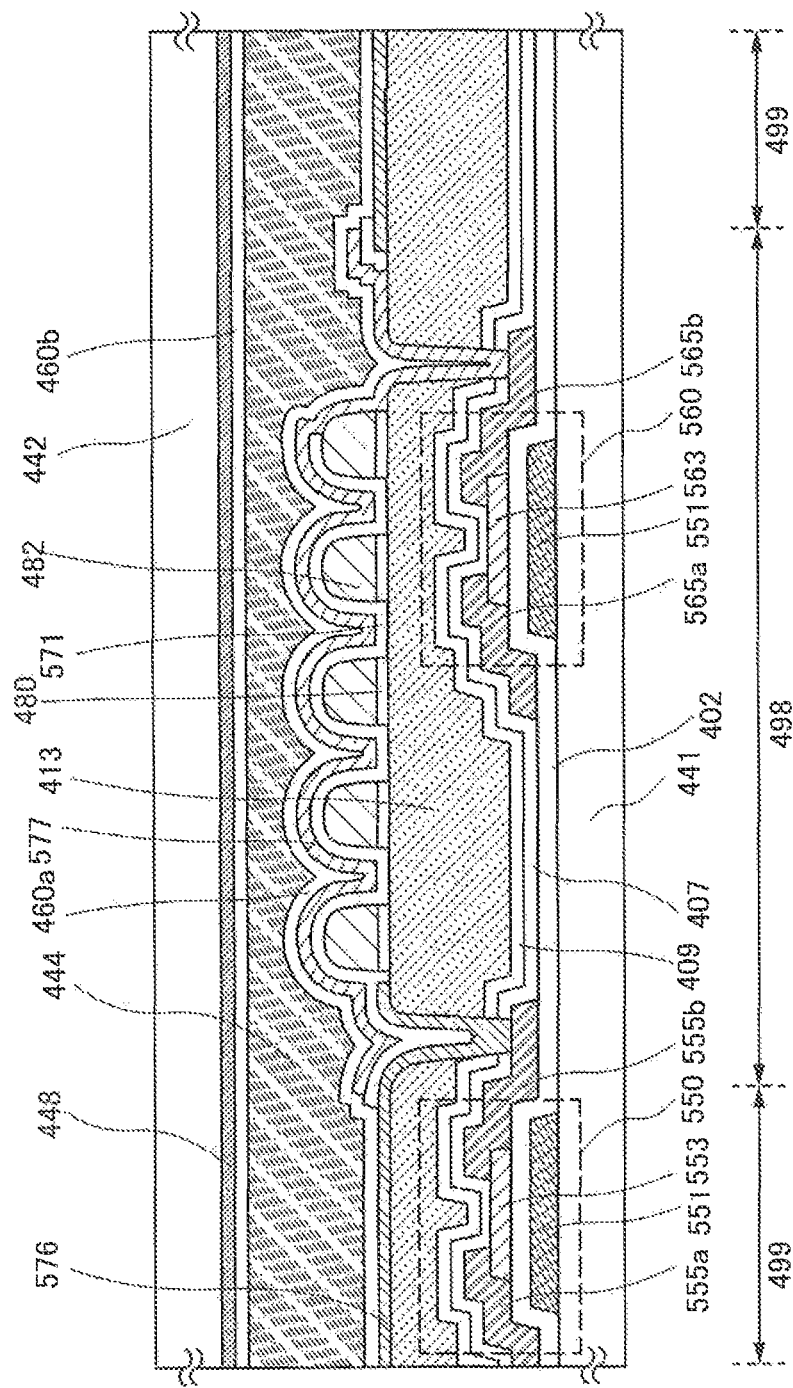
FIG. 10 is a view illustrating one embodiment of a liquid crystal display device.

Examples in which the reflective electrode layer 577 is formed to have unevenness in the liquid crystal display device are illustrated in FIG. 9 and FIG. 10. FIG. 9 illustrates an example in which a surface of the interlayer film 413 in the reflective region 498 is formed to have an uneven shape so that the reflective electrode layer 577 has an uneven shape. The uneven shape of the surface of the interlayer film 413 may be formed by performing selective etching. For example, the interlayer film 413 having the uneven shape can be formed, for example, by performing a photolithography step on a photosensitive organic resin. FIG. 10 illustrates an example in which projected structures are provided over the interlayer film 413 in the reflective region 498 so that the reflective electrode layer 577 has an uneven shape. Note that in FIG. 10, the projected structures are formed by stacking an insulating layer 480 and an insulating layer 482. For example, an inorganic insulating layer of silicon oxide, silicon nitride, or the like can be used as the insulating layer 480, and an organic resin such as a polyimide resin or an acrylic resin can be used as the insulating layer 482. First, a silicon oxide film is formed over the interlayer film 413 by a sputtering method, and a polyimide resin film is formed over the silicon oxide film by a coating method. The polyimide resin film is etched with the use of the silicon oxide film as an etching stopper. The silicon oxide film is etched with the use of the etched polyimide resin layer as a mask, so that the projected structures including a stack of the insulating layer 480 and the insulating layer 482 can be formed as illustrated in FIG. 10.

When the reflective electrode layer 577 has an uneven surface as illustrated in FIG. 9 and FIG. 10, incident light from the outside is irregularly reflected, so that more favorable display can be performed. Accordingly, the visibility of display is improved.

This embodiment can be freely combined with Embodiments 1 to 3.

Embodiment 5

In this embodiment, an example of a transistor which can be applied to a liquid crystal display device disclosed in this specification will be described. There is no particular limitation on a structure of a transistor which can be applied to a liquid crystal display device disclosed in this specification. For example, a top-gate structure or a bottom-gate structure such as a staggered type and a planar type can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned above and below a channel region with a gate insulating layer provided therebetween. Note that examples of a cross-sectional structure of a transistor illustrated FIGS. 11A to 11D are described below. Transistors illustrated in FIGS. 11A to 11D are transistors including an oxide semiconductor as a semiconductor. An advantage of using an oxide semiconductor is that high mobility and low off-state current can be obtained in a relatively easy and low-temperature process: however, it is needless to say that another semiconductor may be used.

Figure 11A:
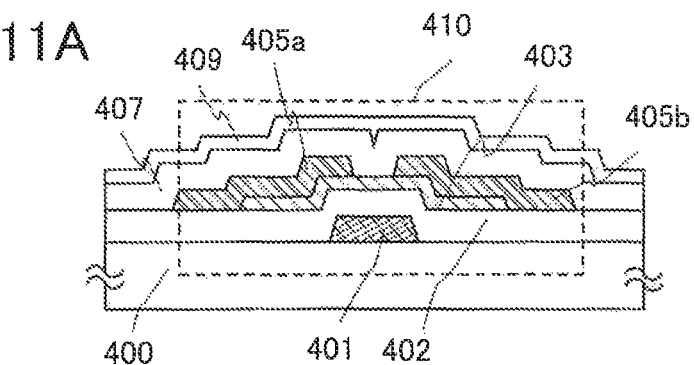
FIGS. 11A to 11D are views each illustrating one embodiment of a transistor applicable to a liquid crystal display device.

A transistor 410 illustrated in FIG. 11A is one of bottom-gate thin film transistors, and is also referred to as an inverted-staggered thin film transistor.

The transistor 410 includes, over a substrate 400 having an insulating surface, a gate electrode layer 401, the gate insulating layer 402, an oxide semiconductor layer 403, a source electrode layer 405*a*, and a drain electrode layer 405*b*. In addition, the insulating film 407 which covers the transistor 410 and is stacked over the oxide semiconductor layer 403 is provided. The insulating film 409 is provided over the insulating film 407.

Figure 11B:
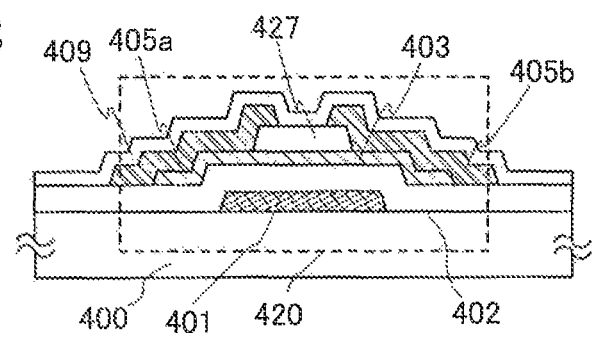

A transistor 420 illustrated in FIG. 11B is one of bottom-gate thin film transistors referred to as a channel-protective (channel-stop) thin film transistor and is also referred to as an inverted-staggered thin film transistor.

The transistor 420 includes, over the substrate 400 having an insulating surface, the gate electrode layer 401, the gate insulating layer 402, the oxide semiconductor layer 403, an insulating layer 427 functioning as a channel protective layer which covers a channel formation region of the oxide semiconductor layer 403, the source electrode layer 405*a*, and the drain electrode layer 405*b*. The insulating film 409 is formed so as to cover the transistor 420.

Figure 11C:
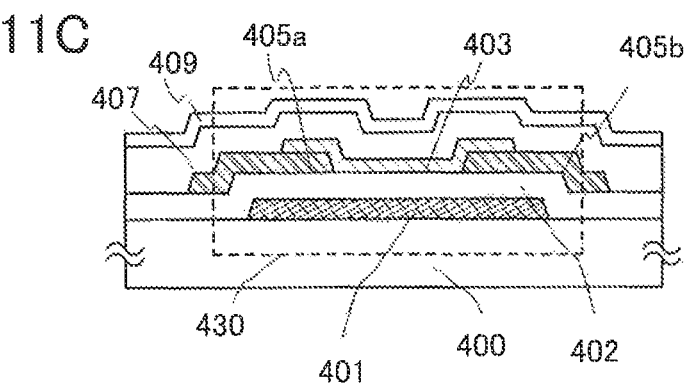

A transistor 430 illustrated in FIG. 11C is a bottom-gate thin film transistor, and includes, over the substrate 400 having an insulating surface, the gate electrode layer 401, the gate insulating layer 402, the source electrode layer 405*a*, the drain electrode layer 405*b*, and the oxide semiconductor layer 403. The insulating film 407 which covers the transistor 430 and is in contact with the oxide semiconductor layer 403 is provided. The insulating film 409 is provided over the insulating film 407.

In the transistor 430, the gate insulating layer 402 is provided on and in contact with the substrate 400 and the gate electrode layer 401, and the source electrode layer 405*a* and the drain electrode layer 405*b* are provided on and in contact with the gate insulating layer 402. Further, the oxide semiconductor layer 403 is provided over the gate insulating layer 402, the source electrode layer 405*a*, and the drain electrode layer 405*b*.

Figure 11D:
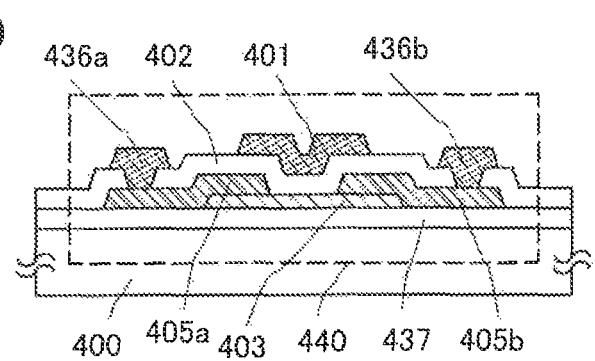

A thin film transistor 440 illustrated in FIG. 11D is one of top-gate thin film transistors. The transistor 440 includes, over the substrate 400 having an insulating surface, insulating layer 437, the oxide semiconductor layer 403, the source electrode layer 405*a*, the drain electrode layer 405*b*, the gate insulating layer 402, and the gate electrode layer 401. A wiring layer 436*a* and a wiring layer 436*b* are provided to be in contact with and electrically connected to the source electrode layer 405*a* and the drain electrode layer 405*b*, respectively.

In this embodiment, as described above, the oxide semiconductor layer 403 is used as a semiconductor layer. As an oxide semiconductor used for the oxide semiconductor layer 403, an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor which are oxides of three metal elements; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, or an In—Mg—O-based oxide semiconductor which are oxides of two metal elements; an In—O-based oxide semiconductor, a Sn—O-based oxide semiconductor, or a Zn—O-based oxide semiconductor can be used. Further, $SiO_2$ may be contained in the above oxide semiconductor. Here, for example, an In—Ga—Zn—O-based oxide semiconductor is an oxide including at least In, Ga, and Zn, and there is no particular limitation on the composition ratio thereof. Further, the In—Ga—Zn—O-based oxide semiconductor may contain an element other than In, Ga, and Zn.

For the oxide semiconductor layer 403, a thin film, represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In the transistors 410, 420, 430, and 440 each including the oxide semiconductor layer 403, a current value in an off state (off-state current value) can be reduced. Therefore, an electrical signal of image data and the like can be held for a longer period, so that a writing interval can be set long. Accordingly, frequency of refresh operation can be reduced, which leads to an effect of suppressing power consumption.

Further, in the transistors 410, 420, 430, and 440 each including the oxide semiconductor layer 403, relatively high field-effect mobility can be obtained, whereby high-speed operation is possible. Therefore, by using any of the transistors in a pixel portion of a liquid crystal display device, color separation can be suppressed and a high-quality image can be provided. Since the transistors can be separately formed over one substrate in a circuit portion and a pixel portion, the number of components can be reduced in the liquid crystal display device.

Although there is no particular limitation on a substrate used for the substrate 400 having an insulating surface, a glass substrate of barium borosilicate glass, aluminoborosilicate glass, or the like is used.

In the bottom-gate transistors 410, 420, and 430, an insulating film serving as a base film may be provided between the substrate and the gate electrode layer. The base film has a function of preventing diffusion of an impurity element from the substrate, and can be formed to have a single-layer or stacked-layer structure using one or more films selected from a silicon nitride film, a silicon oxide film, a silicon nitride oxide film, and a silicon oxynitride film.

The gate electrode layer 401 can be formed to have a single-layer or stacked-layer structure using a metal material such as molybdenum, titanium, chromium, tantalum, tungsten, aluminum, copper, neodymium, or scandium, or an alloy material which contains any of these materials as its main component.

The gate insulating layer 402 can be formed to have a single-layer or stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. For example, by a plasma CVD method, a silicon nitride layer ($SiN_y$ (y>0)) with a thickness of greater than or equal to 50 nm and less than or equal to 200 nm is formed as a first gate insulating layer, and a silicon oxide layer ($SiO_x$ (x>0)) with a thickness of greater than or equal to 5 nm and less than or equal to 300 nm is formed as a second gate insulating layer over the first gate insulating layer, so that a gate insulating layer with a total thickness of 200 nm is formed.

A conductive film used for the source electrode layer 405a and the drain electrode layer 405b can be formed using an element selected from Al, Cr, Cu, Ta, Ti, Mo, and W, an alloy film containing any of these elements, an alloy film containing a combination of any of these elements, or the like. Alternatively, a structure may be employed in which a high-melting-point metal layer of Ti, Mo, W, or the like is stacked over and/or below a metal layer of Al, Cu, or the like. In addition, heat resistance can be improved by using an Al material to which an element (Si, Nd, Sc, or the like) which prevents generation of a hillock or a whisker in an Al film is added.

A material similar to that of the source electrode layer 405a and the drain electrode layer 405b can be used for a conductive film such as the wiring layer 436a and the wiring layer 436b which are connected to the source electrode layer 405a and the drain electrode layer 405b, respectively.

Alternatively, the conductive film to be the source electrode layer 405a and drain electrode layer 405b (including a wiring layer formed in the same layer as the source and drain electrode layers) may be formed using a conductive metal oxide. As the conductive metal oxide, indium oxide ($In_2O_3$), tin oxide ($SnO_2$), zinc oxide (ZnO), indium oxide-tin oxide alloy ($In_2O_3$—$SnO_2$, which is abbreviated to ITO), indium oxide-zinc oxide alloy ($In_2O_3$—ZnO), or any of these metal oxide materials in which silicon oxide is contained can be used.

As the insulating film 407, and the insulating layers 427 and 437, typically, an inorganic insulating film such as a silicon oxide film, a silicon oxynitride film, an aluminum oxide film, or an aluminum oxynitride film can be used.

As the insulating film 409, an inorganic insulating film such as a silicon nitride film, an aluminum nitride film, a silicon nitride oxide film, or an aluminum nitride oxide film can be used.

In addition, a planarization insulating film may be formed over the insulating film 409 in order to reduce surface unevenness due to the transistor. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed using these materials.

Thus, in this embodiment, a high-performance liquid crystal display device can be provided by using a transistor including an oxide semiconductor layer.

Embodiment 6

In this embodiment, an example of a transistor including an oxide semiconductor layer and an example of a manufacturing method thereof will be described in detail with reference to FIGS. 12A to 12E. The same portions as those in the above embodiments and portions having functions similar to those of the portions in the above embodiments and steps similar to those in the above embodiments may be handled as in the above embodiments, and repeated description is omitted. In addition, detailed description of the same portions is not repeated.

FIGS. 12A to 12E illustrate an example of a cross-sectional structure of a transistor. A transistor 510 illustrated in FIGS. 12A to 12E is a bottom-gate inverted-staggered thin film transistor which is similar to the transistor 410 illustrated in FIG. 11A.

An oxide semiconductor used for a semiconductor layer in this embodiment is an i-type (intrinsic) oxide semiconductor or a substantially i-type (intrinsic) oxide semiconductor. The i-type (intrinsic) oxide semiconductor or substantially i-type (intrinsic) oxide semiconductor is obtained in such a manner that hydrogen, which is an n-type impurity, is removed from an oxide semiconductor, and the oxide semiconductor is highly purified so as to contain as few impurities that are not main components of the oxide semiconductor as possible. In other words, a highly-purified i-type (intrinsic) semiconductor or a semiconductor close thereto is obtained not by adding impurities but by removing impurities such as hydrogen or water as much as possible. Accordingly, the oxide semiconductor layer included in the transistor 510 is an oxide semiconductor layer which is highly purified and made to be electrically i-type (intrinsic).

In addition, a highly-purified oxide semiconductor includes extremely few carriers (close to zero), and the carrier concentration thereof is less than $1\times10^{14}/cm^3$, preferably less than $1\times10^{12}/cm^3$, more preferably less than $1\times10^{11}/cm^3$.

Since the oxide semiconductor includes extremely few carriers, off-state current of the transistor 510 can be reduced. The smaller the amount of off-state current is, the better.

Specifically, in the thin film transistor including the oxide semiconductor layer, off-state current density per micrometer in a channel width at room temperature can be less than or equal to 10 aA/μm ($1\times10^{-17}$ A/μm), further less than or equal to 1 aA/μm ($1\times10^{-18}$ A/μm), or still further less than or equal to 10 zA/μm ($1\times10^{-20}$ A/μm).

When a transistor whose current value in an off state (an off-state-current value) is extremely small is used as a transistor in the pixel portion of Embodiment 1, the number of writings of refresh operation in a still image region can be reduced.

In addition, in the transistor 510 including the oxide semiconductor layer, the temperature dependence of on-state current is hardly observed, and off-state current remains extremely small.

Steps of manufacturing the transistor 510 over a substrate 505 are described below with reference to FIGS. 12A to 12E.

First, a conductive film is formed over the substrate 505 having an insulating surface; then, a gate electrode layer 511 is formed through a first photolithography step. Note that a resist mask may be formed by an inkjet method. Formation of the resist mask by an inkjet method needs no photomask; thus, manufacturing cost can be reduced.

As the substrate 505 having an insulating surface, a substrate similar to the substrate 400 described in Embodiment 5 can be used. In this embodiment, a glass substrate is used as the substrate 505.

An insulating film serving as a base film may be provided between the substrate 505 and the gate electrode layer 511. The base film has a function of preventing diffusion of an impurity element from the substrate 505, and can be formed with a single-layer or stacked-layer structure using one or more of a silicon nitride film, a silicon oxide film, a silicon nitride oxide film, and a silicon oxynitride film.

In addition, the gate electrode layer 511 can be formed to have a single-layer or stacked-layer structure using a metal material such as molybdenum, titanium, tantalum, tungsten, aluminum, copper, neodymium, or scandium, or an alloy material which contains any of these materials as its main component.

Next, a gate insulating layer 507 is formed over the gate electrode layer 511. The gate insulating layer 507 can be formed to have a single-layer or stacked-layer structure using a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer, by a plasma CVD method, a sputtering method, or the like.

As the oxide semiconductor in this embodiment, an oxide semiconductor which is made to be an i-type or substantially i-type by removing impurities is used. Such a highly-purified oxide semiconductor is extremely sensitive to an interface level or interface charge; therefore, an interface between the oxide semiconductor layer and the gate insulating layer is important. For that reason, the gate insulating layer that is to be in contact with a highly-purified oxide semiconductor needs to have high quality.

For example, a high-density plasma CVD method using microwaves (e.g., a frequency of 2.45 GHz) is preferably adopted because an insulating layer can be dense and can have high withstand voltage and high quality. When a highly-purified oxide semiconductor and a high-quality gate insulating layer are in close contact with each other, the interface level can be reduced and interface characteristics can be favorable.

It is needless to say that another deposition method such as a sputtering method or a plasma CVD method can be employed as long as a high-quality insulating layer can be formed as a gate insulating layer. Moreover, it is possible to use as the gate insulating layer an insulating layer whose quality and characteristics of an interface with an oxide semiconductor are improved with heat treatment performed after the formation of the insulating layer. In any case, an insulating layer that can reduce interface state density with an oxide semiconductor to form a favorable interface, as well as having favorable film quality as the gate insulating layer, is formed.

Further, in order that hydrogen, a hydroxyl group, and moisture might be contained in the gate insulating layer 507 and an oxide semiconductor film 530 as little as possible, it is preferable that the substrate 505 over which the gate electrode layer 511 is formed or the substrate 505 over which layers up to and including the gate insulating layer 507 are formed be preheated in a preheating chamber of a sputtering apparatus as pretreatment for deposition of the oxide semiconductor film 530 so that impurities such as hydrogen and moisture adsorbed to the substrate 505 are eliminated and exhaustion is performed. As an exhaustion unit provided in the preheating chamber, a cryopump is preferable. Note that this preheating treatment can be omitted. This preheating step may be similarly performed on the substrate 505 over which layers up to and including a source electrode layer 515a and a drain electrode layer 515b are formed before formation of an insulating layer 516.

Figure 12A:
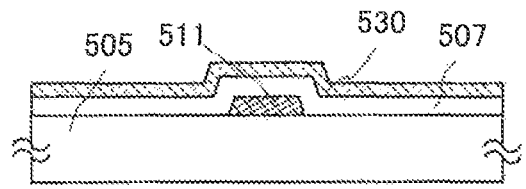
FIGS. 12A to 12E are views illustrating one embodiment of a manufacturing method of a transistor applicable to a liquid crystal display device.
Figure 12B:
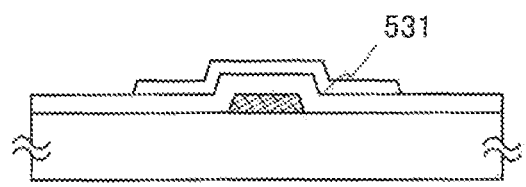

Next, the oxide semiconductor film 530 having a thickness of greater than or equal to 2 nm and less than or equal to 200 nm, preferably greater than or equal to 5 nm and less than or equal to 30 nm is formed over the gate insulating layer 507 (see FIG. 12A).

Note that before the oxide semiconductor film 530 is formed by a sputtering method, powder substances (also referred to as particles or dust) attached on a surface of the gate insulating layer 507 are preferably removed by reverse sputtering in which an argon gas is introduced and plasma is generated. The reverse sputtering refers to a method in which, without application of voltage to a target side, an RF power source is used for application of voltage to a substrate side in an argon atmosphere and plasma is generated in the vicinity of the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, an oxide semiconductor described in Embodiment 5, such as an oxide of four metal elements, an oxide of three metal elements, an oxide of two metal elements, an In—O-based oxide semiconductor, a Sn—O-based oxide semiconductor, or a Zn—O-based oxide semiconductor can be used. Further, $SiO_2$ may be contained in the above oxide semiconductor. In this embodiment, the oxide semiconductor film 530 is deposited by a sputtering method with the use of an In—Ga—Zn—O-based oxide semiconductor target. A cross-sectional view of this stage is illustrated in FIG. 12A. Alternatively, the oxide semiconductor film 530 can be formed by a sputtering method in a rare gas (typically, argon) atmosphere, an oxygen atmosphere, or a mixed atmosphere of a rare gas and oxygen.

As a target for manufacturing the oxide semiconductor film 530 by a sputtering method, for example, a target having a compositional ratio of $In_2O_3:Ga_2O_3:ZnO=1:1:1$ [molar ratio] can be used. Alternatively, a target having a composition ratio of $In_2O_3:Ga_2O_3:ZnO=1:1:2$ [molar ratio]

or $In_2O_3:Ga_2O_3:ZnO=1:1:4$ [molar ratio] may be used. The filling rate of the oxide semiconductor target for film formation is higher than or equal to 90% and lower than or equal to 100%, preferably, higher than or equal to 95% and lower than or equal to 99.9%. With the use of the oxide semiconductor target for film formation with high filling rate, the deposited oxide semiconductor film has high density.

It is preferable that a high-purity gas in which an impurity such as hydrogen, water, a hydroxyl group, or hydride is removed be used as the sputtering gas for the deposition of the oxide semiconductor film 530.

The substrate is placed in a deposition chamber under reduced pressure, and the substrate temperature is set to a temperature higher than or equal to 100° C. and lower than or equal to 600° C., preferably higher than or equal to 200° C. and lower than or equal to 400° C. Deposition is performed while the substrate is heated, whereby the concentration of an impurity contained in the oxide semiconductor layer formed can be reduced. In addition, damage by sputtering can be reduced. Then, residual moisture in the deposition chamber is removed, a sputtering gas from which hydrogen and moisture are removed is introduced, and the above-described target is used, so that the oxide semiconductor film 530 is formed over the substrate 505. In order to remove the residual moisture in the deposition chamber, an entrapment vacuum pump, for example, a cryopump, an ion pump, or a titanium sublimation pump is preferably used. The evacuation unit may be a turbo pump provided with a cold trap. In the deposition chamber which is evacuated with the cryopump, for example, a hydrogen atom, a compound containing a hydrogen atom, such as water ($H_2O$), (more preferably, also a compound containing a carbon atom), and the like are removed, whereby the concentration of an impurity in the oxide semiconductor film formed in the deposition chamber can be reduced.

As one example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulse direct current power source is preferable because powder substances (also referred to as particles or dust) generated in deposition can be reduced and the film thickness can be uniform.

Next, the oxide semiconductor film 530 is processed into an island-shaped oxide semiconductor layer through a second photolithography step. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 507, a step of forming the contact hole can be performed at the same time as processing of the oxide semiconductor film 530.

For the etching of the oxide semiconductor film 530, either one or both of wet etching and dry etching may be employed. As an etchant used for wet etching of the oxide semiconductor film 530, for example, a mixed solution of phosphoric acid, acetic acid, and nitric acid, or the like can be used. In addition, ITO07N (produced by Kanto Chemical Co., Inc.) may also be used.

Next, first heat treatment is performed on the oxide semiconductor layer. The oxide semiconductor layer can be dehydrated or dehydrogenated by this first heat treatment. The temperature of the first heat treatment is higher than or equal to 400° C. and lower than or equal to 750° C., or higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, water or hydrogen is prevented from entering the oxide semiconductor layer without exposure to the air; thus, an oxide semiconductor layer 531 is obtained (see FIG. 12B).

Note that a heat treatment apparatus is not limited to an electrical furnace, and may include a device for heating an object to be processed by heat conduction or heat radiation from a heating element such as a resistance heating element. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high temperature gas, an inert gas which does not react with an object to be treated by heat treatment, such as nitrogen or a rare gas like argon, is used.

For example, as the first heat treatment, GRTA in which the substrate is moved into an inert gas heated to a high temperature as high as 650° C. to 700° C., inclusive, heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to be 6N (99.9999%) or more, preferably 7N (99.99999%) or more (that is, the impurity concentration is 1 ppm or lower, preferably 0.1 ppm or lower).

Further, after the oxide semiconductor layer is heated in the first heat treatment, a high-purity oxygen gas, a high-purity $N_2O$ gas, or an ultra-dry air (the dew point is lower than or equal to −40° C., preferably lower than or equal to −60° C.) may be introduced into the same furnace. It is preferable that water, hydrogen, and the like be not contained in an oxygen gas or an $N_2O$ gas. The purity of the oxygen gas or the $N_2O$ gas which is introduced into the heat treatment apparatus is preferably 6N or more, more preferably 7N or more (that is, the concentration of impurities in the oxygen gas or the $N_2O$ gas is preferably 1 ppm or lower, more preferably 0.1 ppm or lower). By the action of the oxygen gas or the $N_2O$ gas, oxygen which has been reduced at the same time as the step for removing impurities by dehydration or dehydrogenation is supplied, so that the oxide semiconductor layer can be a highly-purified and electrically i-type (intrinsic) oxide semiconductor.

In addition, the first heat treatment of the oxide semiconductor layer can also be performed on the oxide semiconductor film 530 which has not yet been processed into the island-shaped oxide semiconductor layer. In that case, the substrate is taken out from the heat apparatus after the first heat treatment; then a photolithography step is performed.

Note that the first heat treatment may be performed at any of the following timings in addition to the above timing as long as after deposition of the oxide semiconductor layer: after a source electrode layer and a drain electrode layer are formed over the oxide semiconductor layer and after an insulating layer is formed over the source electrode layer and the drain electrode layer.

Further, the step of forming the contact hole in the gate insulating layer 507 may be performed either before or after the first heat treatment is performed on the semiconductor film 530.

In addition, as the oxide semiconductor layer, an oxide semiconductor layer having a crystal region with a large thickness (a single crystal region), that is, a crystal region which is c-axis-aligned perpendicularly to a surface of the film may be formed by performing deposition twice and heat treatment twice, even when any of an oxide, a nitride, a metal, or the like is used for a material of a base component. For example, a first oxide semiconductor film with a thickness greater than or equal to 3 nm and less than or equal to 15 nm is deposited, and first heat treatment is performed in a nitrogen, an oxygen, a rare gas, or a dry air atmosphere at a temperature higher than or equal to 450° C. and lower than or equal to 850° C. or preferably higher than or equal to 550° C. and lower than or equal to 750° C., so that a first oxide semiconductor film having a crystal region (including a plate-like crystal) in a region including a surface is formed. Then, a second oxide semiconductor film which has a larger thickness than the first oxide semiconductor film is formed, and second heat treatment is performed at a temperature higher than or equal to 450° C. and lower than or equal to 850° C. or preferably higher than or equal to 600° C. and lower than or equal to 700° C., so that crystal growth proceeds upward with the use of the first oxide semiconductor film as a seed of the crystal growth and the whole second oxide semiconductor film is crystallized. In such a manner, the oxide semiconductor layer having a crystal region having a large thickness may be formed.

Next, a conductive film serving as the source and drain electrode layers (including a wiring formed in the same layer as the source and drain electrode layers) is formed over the gate insulating layer 507 and the oxide semiconductor layer 531. As the conductive film serving as the source and drain electrode layers, the material used for the source electrode layer 405a and the drain electrode layer 405b which is described in Embodiment 5 can be used.

Figure 12C:
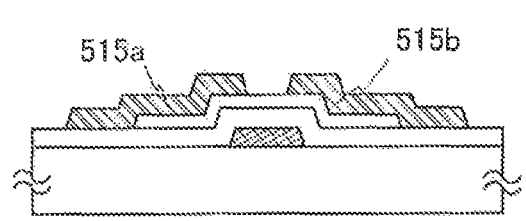

A resist mask is formed over the conductive film through a third photolithography step, and the source electrode layer 515a and the drain electrode layer 515b are formed by selective etching; then, the resist mask is removed (see FIG. 12C).

Light exposure at the time of the formation of the resist mask in the third photolithography step may be performed using ultraviolet light, KrF laser light, or ArF laser light. A channel length L of a transistor that is completed later is determined by a distance between bottom end portions of the source electrode layer and the drain electrode layer, which are adjacent to each other over the oxide semiconductor layer 531. In the case where light exposure is performed for a channel length L of less than 25 nm, the light exposure at the time of the formation of the resist mask in the third photolithography step may be performed using extreme ultraviolet having an extremely short wavelength of several nanometers to several tens of nanometers, inclusive. Light exposure with extreme ultraviolet leads to a high resolution and a large depth of focus. Thus, the channel length L of the transistor that is completed later can be greater than or equal to 10 nm and less than or equal to 1000 nm and the operation speed of a circuit can be increased and furthermore the value of off-state current is extremely small, so that low power consumption can be achieved.

In order to reduce the number of photomasks used in a photolithography step and reduce the number of photolithography steps, an etching step may be performed with the use of a multi-tone mask which is a light-exposure mask through which light is transmitted to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a process can be realized.

Note that it is preferable that etching conditions be optimized so as not to etch and divide the oxide semiconductor layer 531 when the conductive film is etched. However, it is difficult to obtain etching conditions in which only the conductive film is etched and the oxide semiconductor layer 531 is not etched at all. In some cases, only part of the oxide semiconductor layer 531 is etched to be an oxide semiconductor layer having a groove portion (a recessed portion) when the conductive film is etched.

In this embodiment, since the Ti film is used as the conductive film and the In—Ga—Zn—O-based oxide semiconductor is used as the oxide semiconductor layer 531, an ammonium hydroxide/hydrogen peroxide mixture (a mixed solution of ammonia water, water, and hydrogen peroxide solution) is used as an etchant for the conductive film.

Next, by plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 is formed without exposure to the air as a protective insulating film in contact with part of the oxide semiconductor layer.

The insulating layer 516 can be formed to a thickness of at least 1 nm by a method by which an impurity such as water or hydrogen does not enter the insulating layer 516, such as a sputtering method as appropriate. When hydrogen is contained in the insulating layer 516, entry of the hydrogen to the oxide semiconductor layer, or extraction of oxygen in the oxide semiconductor layer by hydrogen may occur, thereby causing the backchannel of the oxide semiconductor layer to have lower resistance (to be n-type), so that a parasitic channel might be formed. Therefore, it is important that a deposition method in which hydrogen is not used is employed in order to form the insulating layer 516 containing as little hydrogen as possible.

In this embodiment, a silicon oxide film is formed to a thickness of 200 nm as the insulating layer 516 with a sputtering method. The substrate temperature in deposition may be higher than or equal to room temperature and lower than or equal to 300° C. and in this embodiment, is 100° C. The silicon oxide film can be deposited by a sputtering method in a rare gas (typically, argon) atmosphere, an oxygen atmosphere, or a mixed atmosphere containing a rare gas and oxygen. As a target, a silicon oxide target or a silicon target may be used. For example, the silicon oxide film can be formed using a silicon target by a sputtering method in an atmosphere containing oxygen. As the insulating layer 516 which is formed in contact with the oxide semiconductor layer, an inorganic insulating film which does not include impurities such as moisture, a hydrogen ion, and $OH^-$ and prevents entry of these from the outside is used. Typically, a silicon oxide film, a silicon oxynitride film, an aluminum oxide film, an aluminum oxynitride film, or the like can be used.

In order to remove residual moisture in the deposition chamber of the insulating layer 516 as in the case of the deposition of the oxide semiconductor film 530, an entrapment vacuum pump (such as a cryopump) is preferably used. When the insulating layer 516 is deposited in the deposition chamber evacuated using a cryopump, the impurity concentration in the insulating layer 516 can be reduced. In addition, as an exhaustion unit for removing the residual moisture in the deposition chamber of the insulating layer 516, a turbo pump provided with a cold trap may be used.

It is preferable that a high-purity gas in which an impurity such as hydrogen, water, a hydroxyl group, or hydride is removed be used as the sputtering gas for the deposition of the insulating layer 516.

Next, second heat treatment is performed in an inert gas atmosphere or oxygen gas atmosphere (preferably at a temperature higher than or equal to 200° C. and lower than or equal to 400° C., for example, higher than or equal to 250° C. and lower than or equal to 350° C.). For example, the second heat treatment is performed in a nitrogen atmosphere at 250° C. for one hour. In the second heat treatment, part of the oxide semiconductor layer (a channel formation region) is heated while being in contact with the insulating layer 516.

Through the above process, the first heat treatment is performed on the oxide semiconductor film so that an impurity such as hydrogen, moisture, a hydroxyl group, or hydride (also referred to as a hydrogen compound) is intentionally removed from the oxide semiconductor layer. Additionally, oxygen which is reduced at the same time as the step for removing impurities can be supplied. Accordingly, the oxide semiconductor layer is highly purified to be an electrically i-type (intrinsic) semiconductor.

Figure 12D:
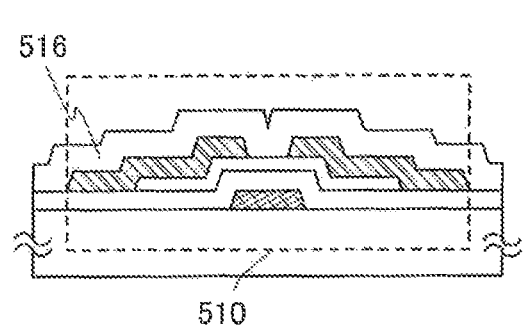
Figure 12E:
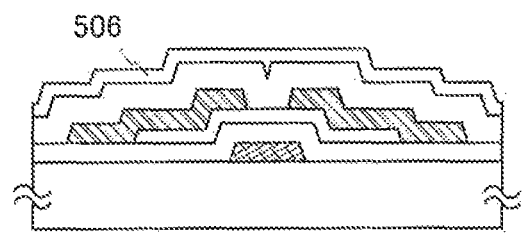

Through the above process, the transistor 510 is formed (FIG. 12D).

When a silicon oxide layer having a lot of defects is used as the oxide insulating layer, heat treatment after formation of the silicon oxide layer has an effect in diffusing an impurity such as hydrogen, moisture, a hydroxyl group, or hydride contained in the oxide semiconductor layer to the oxide insulating layer so that the impurity contained in the oxide semiconductor layer can be further reduced.

A protective insulating layer 506 may be formed over the insulating layer 516. For example, a silicon nitride film is formed by an RF sputtering method. Since an RF sputtering method has high productivity, it is preferably used as a deposition method of the protective insulating layer. As the protective insulating layer 506, an inorganic insulating film which does not include an impurity such as moisture and prevents entry of these from the outside, such as a silicon nitride film or an aluminum nitride film can be used. In this embodiment, the protective insulating layer 506 is formed using a silicon nitride film (see FIG. 12E).

In this embodiment, as the protective insulating layer 506, a silicon nitride film is formed by heating the substrate 505 over which layers up to and including the insulating layer 516 are formed, to a temperature of 100° C. to 400° C., inclusive, introducing a sputtering gas containing high-purity nitrogen from which hydrogen and moisture are removed, and using a target of silicon semiconductor. In this case, the protective insulating layer 506 is preferably deposited removing residual moisture in a treatment chamber, similarly to the insulating layer 516.

After the formation of the protective insulating layer 506, heat treatment may be further performed at a temperature higher than or equal to 100° C. and lower than or equal to 200° C. in the air atmosphere for greater than or equal to 1 hour and less than or equal to 30 hours. This heat treatment may be performed at a fixed heating temperature. Alternatively, the following change in the heating temperature may be conducted plural times repeatedly: the heating temperature is increased from a room temperature to a temperature higher than or equal to 100° C. and lower than or equal to 200° C., inclusive and then decreased to a room temperature.

In this manner, with the use of the transistor including a highly-purified oxide semiconductor layer manufactured using this embodiment, the current value in an off state (an off-state current value) can be further reduced. Accordingly, an electric signal such as image data can be held for a longer period and a writing interval can be set long. Therefore, the frequency of refresh operation can be reduced, which leads to a decrease in power consumption.

In addition, since the transistor including a highly-purified oxide semiconductor layer has high field-effect mobility, high-speed operation is possible. Accordingly, by using the transistor in a pixel portion of a liquid crystal display device, a high-quality image can be provided. In addition, since the transistor can be separately formed in a driver circuit portion and a pixel portion over one substrate, the number of components of the liquid crystal display device can be reduced.

This embodiment can be implemented combining with another embodiment as appropriate.

Embodiment 7

In this embodiment, a pixel structure which enables increase in the amount of reflected light and transmitted light per one pixel in a semi-transmissive liquid crystal display device will be described with reference to FIG. 14, FIGS. 15A to 15E, and FIG. 16.

Figure 14:
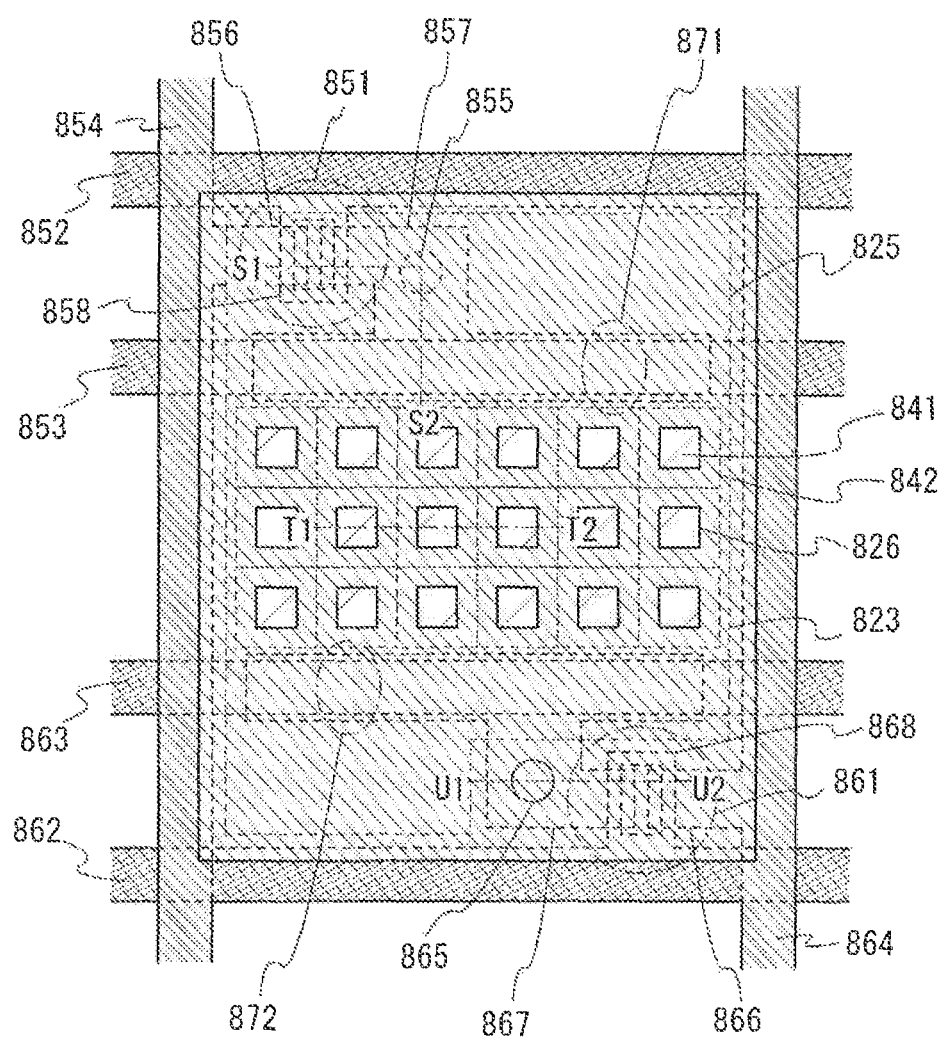
FIG. 14 is a view illustrating one embodiment of a liquid crystal display device.
Figure 15A:
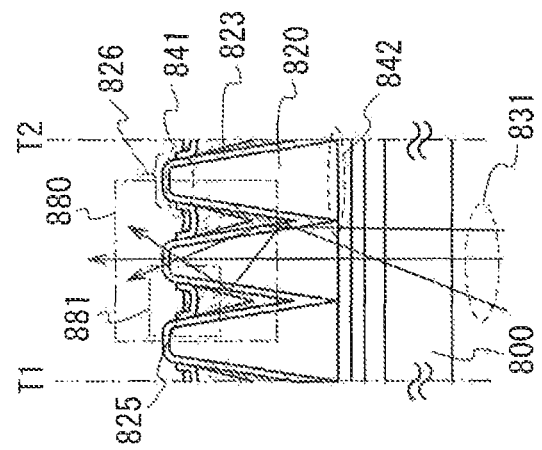
FIGS. 15A to 15E are views illustrating one embodiment of a liquid crystal display device.
Figure 15B:
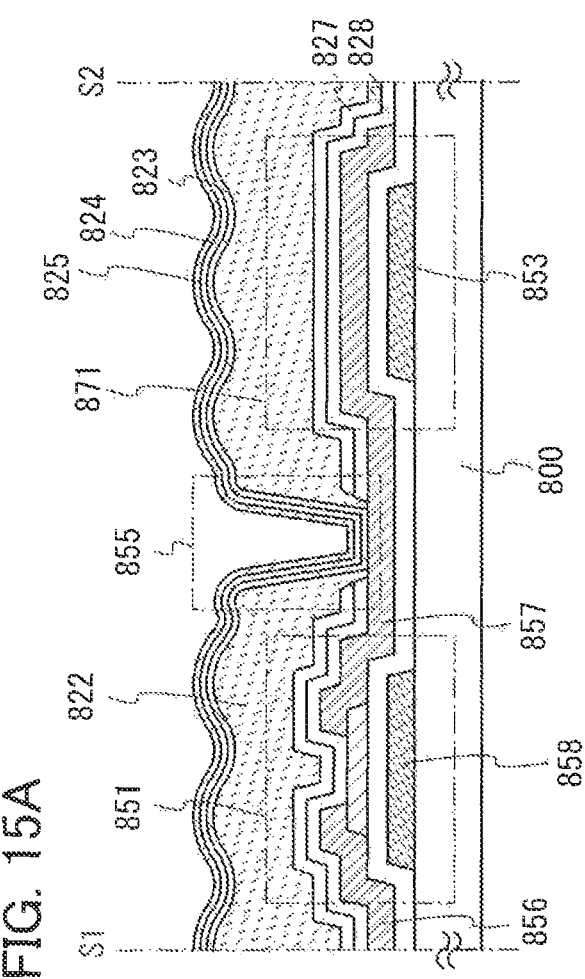
Figure 15E:
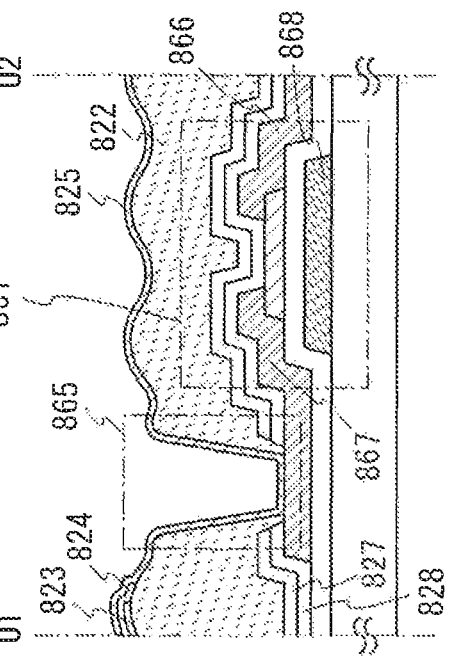

FIG. 14 is a view illustrating a plan structure of a pixel described in this embodiment. FIGS. 15A, 15B, and 15E illustrate cross-sectional structures of a portion along S1-S2, a portion along T1-T2, and a portion along U1-U2, respectively, denoted by dashed lines in FIG. 14. In the pixel described in this embodiment, over a substrate 800, a transparent electrode 823 and a reflective electrode 825 which are used as pixel electrodes are stacked with an insulating layer 824 interposed therebetween.

The transparent electrode 823 is connected to a drain electrode 857 of a transistor 851 through a contact hole 855 provided in an insulating film 827, an insulating film 828, and an organic resin film 822. The drain electrode 857 overlaps with a capacitor wiring 853 with a gate insulating layer interposed therebetween to form a storage capacitor 871 (see FIG. 15A).

A gate electrode 858 of the transistor 851 is connected to a wiring 852, and a source electrode 856 is connected to a wiring 854. The transistor described in any of the other embodiments can be used for the transistor 851 (see FIG. 14).

The reflective electrode 825 is connected to a drain electrode 867 of a transistor 861 through a contact hole 865 provided in the insulating film 827, the insulating film 828, and the organic resin film 822 (see FIG. 15E). The drain electrode 867 overlaps with a capacitor wiring 863 with a gate insulating layer interposed therebetween to form a storage capacitor 872.

A gate electrode 868 of the transistor 861 is connected to a wiring 862, and a source electrode 866 of the transistor 861 is connected to a wiring 864. The transistor described in any of the other embodiments can be used as the transistor 861 (see FIG. 14).

External light is reflected by the reflective electrode 825, so that the pixel electrode can function as a pixel electrode of a reflective liquid crystal display device. The reflective electrode 825 is provided with a plurality of openings 826. In the opening 826, the reflective electrode 825 does not exist, and a structure 820 and the transparent electrode 823 are projected (see FIG. 15B). Light from the backlight is transmitted through the opening 826, so that the pixel electrode can function as a pixel electrode of a transmissive liquid crystal display device.

In the semi-transmissive liquid crystal display device described in this embodiment, the reflective electrode 825 and the transparent electrode 823 are electrically isolated using the insulating layer 824. The potential applied to the transparent electrode 823 can be controlled by the transistor 851, and the potential applied to the reflective electrode 825 can be controlled by the transistor 861; therefore, the potential of the reflective electrode 825 and the potential of the transparent electrode 823 can be controlled independently. Accordingly, when the semi-transmissive liquid crystal display device functions as a transmissive type, the liquid crystal display on the reflective electrode 825 can be black display.

Figure 16:
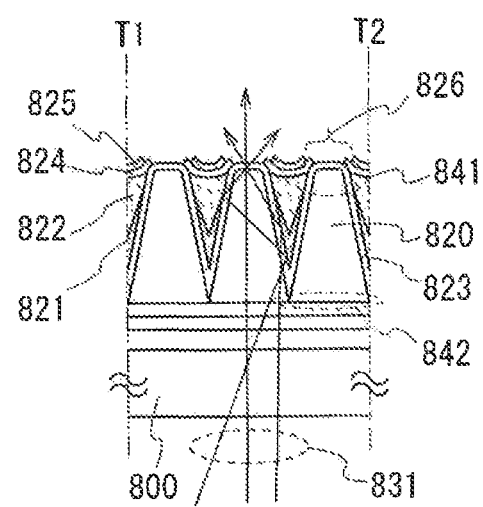
FIG. 16 is a view illustrating one embodiment of a liquid crystal display device.

FIG. 16 is a cross-sectional view illustrating an example different from that in FIG. 15B, which is one embodiment of the present invention having a structure in which the structure 820 and the transparent electrode 823 are not projected in the opening 826. In FIG. 15B, a backlight exit 841 and the opening 826 have almost the same size, whereas in FIG. 16, the backlight exit 841 and the opening 826 have different sizes and different distances from a backlight entrance 842. Accordingly, the amount of transmitted light can be made larger in FIG. 15B than in FIG. 16, and it can be said that the cross-sectional shape in FIG. 15B is preferable.

Figure 15C:
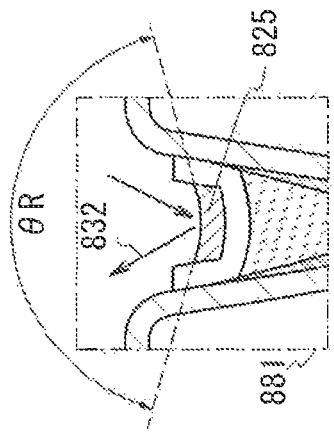
Figure 15D:
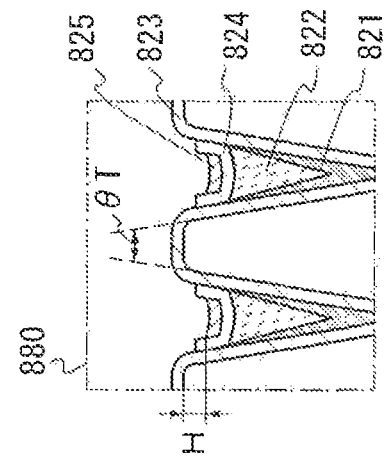

In a lower layer of the opening 826, the structure 820 is formed to overlap with the opening 826. FIG. 15B is a cross-sectional view of the portion along T1-T2 in FIG. 14, which illustrates the structures of the pixel electrode and the structure 820. FIG. 15C is an enlarged view of a portion 880, and FIG. 15D is an enlarged view of a portion 881.

Reflected light 832 is external light reflected by the reflective electrode 825. The top surface of the organic resin film 822 is a curving surface with an uneven shape. By reflecting the curving surface with an uneven shape on the reflective electrode 825, the area of the reflective region can be increased, and reflection of an object other than the displayed image is reduced so that visibility of the displayed image can be improved. In the cross-sectional shape, the angle θR at a point where the reflective electrode 825 having a curving surface is most curved, formed by two inclined planes facing each other may be greater than or equal to 90°, preferably greater than or equal to 100° and less than or equal to 120° (see FIG. 15D).

The structure 820 includes the backlight exit 841 on the opening 826 side and the backlight entrance 842 on a backlight (not illustrated) side. The upper portion of the structure 820 is positioned above the surface of the reflective electrode 825 and protrudes from the upper end portion of the reflective electrode; that is, the distance H between the upper end portion of the structure 820 and the upper end portion of the reflective electrode is greater than or equal to 0.1 μm and less than or equal to 3 μm, preferably greater than or equal to 0.3 μm and less than or equal to 2 μm. The backlight entrance 842 is formed to have a larger area than that of the backlight exit 841. A reflective layer 821 is formed on the side surfaces of the structure 820 (surfaces on which the backlight exit 841 and the backlight entrance 842 are not formed). The structure 820 can be formed using a material having a light-transmitting property such as silicon oxide, silicon nitride, or silicon oxynitride. The reflective layer 821 can be formed using a material with high light reflectance such as aluminum (Al) or silver (Ag).

Transmitted light 831 emitted from the backlight enters the structure 820 through the backlight entrance 842. Some of the incident transmitted light 831 is directly emitted from the backlight exit 841, some is reflected toward the backlight exit 841 by the reflective layer 821, and some is further reflected to return to the backlight entrance 842.

At this time, according to the shape of a cross section of the structure 820 including a line passing through the backlight exit 841 and the backlight entrance 842, side surfaces on right and left facing each other are inclined surfaces. The angle θT formed by the side surfaces is made to be less than 90°, preferably greater than or equal to 10° and less than or equal to 60°, so that the transmitted light 831 incident from the backlight entrance 842 can be guided efficiently to the backlight exit 841 (see FIG. 15C).

For example, in one pixel, the area of the pixel electrode is set to 100%. The area of an electrode functioning as a reflective electrode is SR, and the area of an electrode functioning as a transmissive electrode (the area of the opening 826) is ST. In that case, in a conventional semi-transmissive liquid crystal display device, the total area of the area SR of the electrode functioning as the reflective electrode and the area ST of the electrode functioning as the transmissive electrode accounts for 100% of the area of the pixel electrode. In the semi-transmissive liquid crystal display device having the pixel structure described in this embodiment, the area ST of the electrode functioning as a transmissive electrode corresponds to the area of the backlight entrance 842, whereby the area ST of the opening 826 can be increased. Since the area ST of the electrode functioning as a transmissive electrode corresponds to the area of the backlight entrance 842, the amount of transmitted light can be increased without increasing the luminance of the backlight. Therefore, the total area of the area SR of the electrode functioning as a reflective electrode and the area ST of the electrode functioning as a transmissive electrode can be greater than or equal to 100%. In other words, the proportion of the area of the pixel electrode in appearance can be greater than or equal to 100%.

By using this embodiment, a semi-transmissive liquid crystal display device with bright and high-quality display can be obtained without increasing power consumption.

Embodiment 8

In this embodiment, an example of an electronic device including the liquid crystal display device described in any of the above embodiments will be described.

Figure 13A:
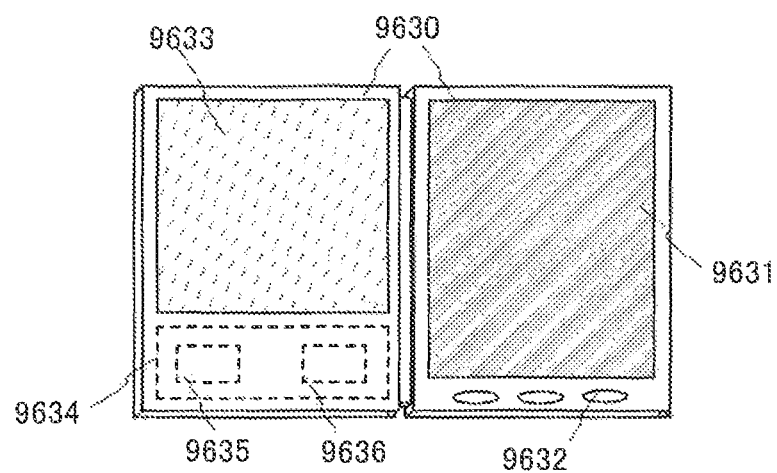
FIGS. 13A and 13B are diagrams illustrating one embodiment of an electronic device.

FIG. 13A illustrates an electronic book reader (also referred to as an e-book reader) which can include housings 9630, a display portion 9631, operation keys 9632, a solar battery 9633, and a charge and discharge control circuit 9634. The electronic book reader illustrated in FIG. 13A has a function of displaying various kinds of information (e.g., a still image, a moving image, and a text image) on the display portion, a function of displaying a calendar, a date, the time, or the like on the display portion, a function of operating or editing the information displayed on the display portion, a function of controlling processing by various kinds of software (programs), and the like. Note that in FIG. 13A, a structure including a battery 9635 and a DCDC converter (hereinafter abbreviated as a converter 9636) is illustrated as an example of the charge and discharge control circuit 9634.

When a semi-transmissive liquid crystal display device is used as the display portion 9631, the electronic book reader is expected to be used in a relatively bright environment, in which case the structure illustrated in FIG. 13A is preferable because power generation by the solar battery 9633 and charge in the battery 9635 are effectively performed. Note that a structure in which the solar battery 9633 is provided on each of a surface and a rear surface of the housing 9630 is preferable in order to charge the battery 9635 efficiently. When a lithium ion battery is used as the battery 9635, there is an advantage of downsizing or the like.

Figure 13B:
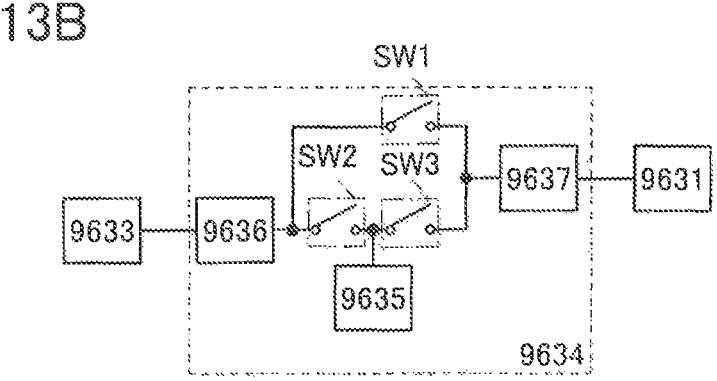

The structure and the operation of the charge and discharge control circuit 9634 illustrated in FIG. 13A will be described with reference to a block diagram in FIG. 13B. The solar battery 9633, the battery 9635, the converter 9636, a converter 9637, switches SW1 to SW3, and the display portion 9631 are illustrated in FIG. 13B, and the battery 9635, the converter 9636, the converter 9637, and the switches SW1 to SW3 correspond to the charge and discharge control circuit 9634.

First, an example of operation in the case where power is generated by the solar battery 9633 using external light is described. The voltage of power generated by the solar battery is raised or lowered by the converter 9636 so that the power has voltage for charging the battery 9635. Then, when the power from the solar battery 9633 is used for the operation of the display portion 9631, the switch SW1 is turned on and the voltage of the power is raised or lowered by the converter 9637 so as to be voltage needed for the display portion 9631. In addition, when display on the display portion 9631 is not performed, the switch SW1 is turned off and the switch SW2 is turned on so that charge of the battery 9635 may be performed.

Next, operation in the case where power is not generated by the solar battery 9633 using external light is described. The voltage of power accumulated in the battery 9635 is raised or lowered by the converter 9637 by turning on the switch SW3. Then, power from the battery 9635 is used for the operation of the display portion 9631.

Note that although the solar battery 9633 is described as an example of a means for charge, charge of the battery 9635 may be performed with another means. In addition, a combination of the solar battery 9633 and another means for charge may be used.

This embodiment can be implemented in appropriate combination with any of the structures described in the other embodiments.

This application is based on Japanese Patent Application serial no. 2009-298456 filed with Japan Patent Office on Dec. 28, 2009, the entire contents of which are hereby incorporated by reference.

EXPLANATION: OF REFERENCE

100: liquid crystal display device, 101: image signal supply source, 102: A/D converter circuit, 110: image processing circuit, 111: memory circuit, 112: comparison circuit, 113: display control circuit, 114: field sequential signal generator circuit, 115: selection circuit, 120: display panel, 121: driver circuit, 122: pixel portion, 123: pixel, 123a: sub-pixel, 123b: sub-pixel, 125a: polarizing plate, 125b: polarizing plate, 126: FPC, 130: backlight portion, 131: backlight control circuit, 132: backlight, 133: light-emitting element, 133R: LED, 133G: LED, 133B: LED, 134: diffusion plate, 135: light, 139: external light, 140: analog image signal, 141: digital image signal, 142: LC image signal, 143: backlight signal, 151: pixel portion, 152: first scan line, 153: first signal line, 154: second scan line, 155: second signal line, 156: pixel, 157: first scan line driver circuit, 158: first signal line driver circuit, 159: second scan line driver circuit, 160: second signal line driver circuit, 161: light-transmitting electrode portion, 162: reflective electrode portion, 163: pixel transistor, 164: liquid crystal element, 165: capacitor, 166: pixel transistor, 167: liquid crystal element, 168: capacitor, 169: common electrode, 170: capacitor line, 190: liquid crystal display module, 301: moving-image display period, 302: still-image display period, 303: still-image writing period, 304: still-image holding period, 311: light-emitting element, 400: substrate, 401: gate electrode layer, 402: gate insulating layer, 403: oxide semiconductor layer, 405a: source electrode layer, 405b: drain electrode layer, 407: insulating film, 409: insulating film, 410: transistor, 413: interlayer film, 420: transistor, 427: insulating layer, 430: transistor, 436a: wiring layer, 436b: wiring layer, 437: insulating layer, 440: transistor, 441: substrate, 442: substrate, 444: liquid crystal layer, 448: common electrode layer, 460a: alignment film, 460b: alignment film, 480: insulating layer, 482: insulating layer, 498: reflective region, 499: transmissive region, 505: substrate, 506: protective insulating layer, 507: gate insulating layer, 510: transistor, 511: gate electrode layer, 515a: source electrode layer, 515b: drain electrode layer, 516: insulating layer, 530: oxide semiconductor film, 531: oxide semiconductor layer, 550: transistor, 551: gate electrode layer, 553: semiconductor layer, 555a: source or drain electrode layer, 555b: source or drain electrode layer, 558: capacitor wiring layer, 560: transistor, 563: semiconductor layer, 565a: source or drain electrode layer, 565b: source or drain electrode layer, 571: insulating film, 576: transparent electrode layer, 577: reflective electrode layer, 579: conductive layer, 580: wiring layer, 800: substrate, 820: structure, 821: reflective layer, 822: organic resin film, 823: transparent electrode, 824: insulating layer, 825: reflective electrode, 826: opening, 827: insulating film, 828: insulating film, 831: transmitted light, 832: reflected light, 841: backlight exit, 842: backlight entrance, 851: transistor, 852: wiring, 833: capacitor wiring, 854: wiring, 855: contact hole, 856: source electrode, 857: drain electrode, 858: gate electrode, 861: transistor, 862: wiring, 863: capacitor wiring, 864: wiring, 865: contact hole, 866: source electrode, 867: drain electrode, 868: gate electrode, 871: storage capacitor, 872: storage capacitor, 880: portion, 881: portion, 9630: housing, 9631: display portion, 9632: operation key, 9633: solar battery, 9634: charge and discharge control circuit, 9635: battery, 9636: converter, and 9637: converter.

The invention claimed is:
1. A display device comprising:
a transistor comprising an oxide semiconductor layer including a channel region; and
a pixel electrode electrically connected to the transistor,
wherein the oxide semiconductor layer comprises indium, zinc, and gallium,
wherein an off-state current density per micrometer in a channel width of the transistor at room temperature is less than or equal to $1\times10^{-17}$ A/μm, wherein the display device is configured to operate at a first refresh rate in a first period and at a second refresh rate in a second period, and wherein the second refresh rate is lower than the first refresh rate.

2. The display device according to claim 1, wherein the display device is configured to display a moving image in the first period and a still image in the second period.

3. The display device according to claim 1, wherein a cycle of one frame period in the second period is longer than or equal to one minute.

4. The display device according to claim 1,
wherein the pixel electrode is a reflective electrode.

5. The display device according to claim 1,
wherein the pixel electrode is a transparent electrode.

6. The display device according to claim 1, further comprising a liquid crystal layer adjacent to the pixel electrode.

7. The display device according to claim 1, wherein the oxide semiconductor layer comprises a crystal whose c-axis is perpendicular to a surface of the oxide semiconductor layer.

8. A display device comprising:
a display panel comprising a transistor and a pixel electrode electrically connected to the transistor, the transistor comprising an oxide semiconductor layer including a channel region; and
a processing circuit configured to determine whether the display panel is operated in a first operation mode at a first refresh rate or a second operation mode at a second refresh rate,
wherein the oxide semiconductor layer comprises indium, zinc, and gallium, and
wherein an off-state current density per micrometer in a channel width of the transistor at room temperature is less than or equal to $1 \times 10^{-17}$ A/μm.

9. The display device according to claim 8,
wherein the second refresh rate is lower than the first refresh rate.

10. The display device according to claim 8,
wherein the display device is configured to display a moving image in the first operation mode and a still image in the second operation mode.

11. The display device according to claim 8, wherein the processing circuit is an image processing circuit comprising:
a memory circuit configured to store an image signal;
a comparison circuit configured to compare the image signal with image signals in a series of periods and to calculate a difference; and a display control circuit configured to control operation of the display panel in accordance with the comparison result.

12. The display device according to claim 8, wherein a cycle of one frame period in the second operation mode is longer than or equal to one minute.

13. The display device according to claim 8,
wherein the pixel electrode is a reflective electrode.

14. The display device according to claim 8,
wherein the pixel electrode is a transparent electrode.

15. The display device according to claim 8, further comprising a liquid crystal layer adjacent to the pixel electrode.

16. The display device according to claim 8, wherein the oxide semiconductor layer comprises a crystal whose c-axis is perpendicular to a surface of the oxide semiconductor layer.

17. A driving method of a display device comprising:
a transistor comprising an oxide semiconductor layer including a channel region; and
a pixel electrode electrically connected to the transistor,
the driving method comprising:
performing first display at a first refresh rate in a first period; and
performing second display at a second refresh rate in a second period, wherein the second refresh rate is lower than the first refresh rate,
wherein the oxide semiconductor layer comprises indium, zinc, and gallium, and
wherein an off-state current density per micrometer in a channel width of the transistor at room temperature is less than or equal to $1 \times 10^{-17}$ A/μm.

18. The driving method according to claim 17,
wherein the display device further comprises a liquid crystal layer adjacent to the pixel electrode.

19. The driving method according to claim 17,
wherein a moving image is displayed in the first period and a still image is displayed in the second period.

20. The driving method according to claim 17, wherein a cycle of one frame period in the second period is longer than or equal to one minute.

21. The driving method according to claim 17, wherein the oxide semiconductor layer comprises a crystal whose c-axis is perpendicular to a surface of the oxide semiconductor layer.

* * * * *